(12) United States Patent
Goenaga et al.

(10) Patent No.: US 9,687,792 B2
(45) Date of Patent: Jun. 27, 2017

(54) ADDITIVES FOR BORON REJECTION ENHANCEMENT OF A MEMBRANE

(71) Applicants: LG CHEM, LTD., Seoul (KR); LG NANOH2O, INC., El Segundo, CA (US)

(72) Inventors: Alberto Goenaga, Playa Vista, CA (US); Brett Anderson Holmberg, Redondo Beach, CA (US); Andrew Ford, Hollywood, CA (US); Amit Sankhe, Vista, CA (US); Christopher Kurth, Eden Prairie, MN (US); Robert Burk, Seattle, WA (US); Jin Kuk Lee, Daejeon (KR); Jeff Koehler, Pasadena, CA (US); Sung Yeol Choi, Daejeon (KR); Youngsik Eom, Daejeon (KR); Hyungsam Choi, Daejeon (KR)

(73) Assignees: LG CHEM, LTD., Seoul (KR); LG NANOH2O, INC., El Segundo, CA (US)

( * ) Notice: Subject to any disclaimer, the term of this patent is extended or adjusted under 35 U.S.C. 154(b) by 95 days.

(21) Appl. No.: 14/841,546

(22) Filed: Aug. 31, 2015

(65) Prior Publication Data
US 2017/0056837 A1    Mar. 2, 2017

(51) Int. Cl.
*B01D 69/12* (2006.01)
*B01D 63/10* (2006.01)
*B01D 71/60* (2006.01)

(52) U.S. Cl.
CPC .......... *B01D 69/125* (2013.01); *B01D 63/10* (2013.01); *B01D 71/60* (2013.01)

(58) Field of Classification Search
None
See application file for complete search history.

(56) References Cited

U.S. PATENT DOCUMENTS

| 8,182,695 B2 * | 5/2012 | Whiteford | C07D 498/18 205/751 |
| 8,505,743 B2 * | 8/2013 | Sarkar | B01D 65/08 210/490 |

(Continued)

FOREIGN PATENT DOCUMENTS

CN    102380318 A  *  3/2012

*Primary Examiner* — Krishnan S Menon

(57) ABSTRACT

Provided is an interfacial polymerization process for preparation of a highly permeable thin film composite membrane, which can be used for nanofiltration, forward osmosis, or reverse osmosis, particularly for use with brackish water or seawater. The process includes contacting a porous support membrane with an aqueous phase containing a polyamine to form a coated support membrane, and applying an organic phase containing a polyfunctional acid halide to the coated support membrane to interfacially polymerize the polyamine and the polyfunctional acid halide to form a discrimination layer of a thin film composite membrane, where the aqueous and/or organic phases include a flux-enhancing additive and a boron rejection-enhancing additive that includes a biguanide compound, dicarbonate compound, pentathiodicarbonate compound, or salts thereof. Also provided are the membranes prepared by the methods and reverse osmosis modules containing the membranes.

11 Claims, 1 Drawing Sheet

(56) References Cited

U.S. PATENT DOCUMENTS

| | | | |
|---|---|---|---|
| 8,733,558 B2* | 5/2014 | Mickols | B01D 67/0093 210/490 |
| 2010/0075131 A1* | 3/2010 | Etzel | C08J 7/18 428/315.5 |

* cited by examiner

ADDITIVES FOR BORON REJECTION ENHANCEMENT OF A MEMBRANE

FIELD OF THE INVENTION

Provided are thin film composite (TFC) membranes and methods of preparing TFC membranes, including membranes used for nanofiltration, reverse osmosis, and forward osmosis, to purify water, such as tap water, brackish water or seawater, that exhibit high boron rejection and high flux that are stable over long periods of time, particularly after exposure to cleaning regimens that incorporate reagents of high and low pH values. In particular, provided are TFC membranes that incorporate a boron rejection-enhancing additive in the structure of the membrane that exhibit greater boron rejection values than the same membrane prepared in the absence of the boron rejection-enhancing additive.

BACKGROUND

Seawater desalination is an important process due to increased water demand and decreased suitable water sources. With the increasing awareness of the impact that seawater contaminants have on the environment and human health, water quality standards are becoming increasingly stringent. Boron is a naturally occurring nonmetallic element that is present in seawater at an average concentration of 4.7 milligrams per liter (mg/L). Dissolved boron in seawater occurs predominantly in the boric acid form $(B(OH)_3)$, with lesser amounts of the dissociated forms $(H_2BO_3^-, HBO_3^{2-}, \text{and } BO_3^{3-})$. While boron is a vital element for organism growth, excessive exposure can cause detrimental effects to plants, animals, and possibly humans. Consequently, the World Health Organization (WHO) has issued Guidelines for Drinking Water Quality that propose a maximum recommended boron concentration in drinking water of 2.4 mg/L. Boron also is on the U.S. Environmental Protection Agency's (EPA) Drinking Water Contaminant Candidate List, though there is limited information on the occurrence of boron in drinking water supplies in the United States.

The availability of technologies to remove boron from seawater is limited. Treatment options include ion exchange processes, such as those that include the use of ion exchange resins, such as boron-specific resins consisting of a styrene-divinylbenzene (DVB) backbone with N-methyl glucamine active sites, and resins that are a mixture of conventional strong-acid-strong-base mixed bed resins. Drawbacks of using ion exchange methods include high costs and the fact that conventional resins remove all other ions, in addition to boron ions, necessitating frequent regeneration with acid and base.

Reverse osmosis (RO) processes also are widely used to treat seawater and brackish water. Despite high removal (>99%) of other ionic species from seawater, the removal of boron by RO has proven challenging. Unlike most elements in seawater, boric acid is nonpolar and uncharged; thus, it interacts very differently with RO membrane materials relative to charged salt ions and polar water molecules, making it more difficult to reject. It is difficult for an RO process to achieve an average boron rejection over 90%, the value typically required in order to produce permeate that meets the provisional WHO boron guidelines. Commercialized membranes, such as those used in seawater reverse osmosis plants, generally achieve an average rejection of less than 90% and sometimes as low as 40% with low-pressure brackish water RO membranes (Kim et al., "Boron Rejection by Reverse Osmosis Membranes: National Reconnaissance and Mechanism Study," Desalination and Water Purification Research and Development Program Report No. 127, July 2009). Thus, the ability of thin film composite (TFC) membranes to reject boron, particularly in the uncharged boric acid form, is often too low for many applications.

Approaches to addressing this problem include chemical treatment of the feed stream and/or the use of two or more filtration steps (e.g., multiple-pass RO), such as the systems described in U.S. Pat. No. 6,709,590. These approaches have drawbacks, as water costs are significantly higher than for single-pass RO systems and some are augmented with boron-specific ion exchange resin for the purpose of converting non-ionized boric acid to negatively charged borate ion (which is more highly rejected), further increasing costs.

Another approach to reducing the boron content in water involves coating the membrane after formation with an agent that enhances boron rejection. Organic biocidal compounds, such as biguanides, particularly polyhexamethylene biguanide (PHMB) or PHMB hydrochloride, have been used to coat reverse osmosis membranes to enhance boron rejection. Such coatings, for example, those disclosed in U.S. Pat. No. 7,491,334, involve treating a polyamide RO membrane after it has been formed by contacting the RO membrane with a chemical solution that contains PHMB.

A disadvantage of the PHMB coating is that the selection of cleaning and treatment options often necessary to maintain proper operation of the membrane is limited. During the course of normal operation, the membranes of RO systems can become fouled by suspended solids, microorganisms, and mineral scale that build up during operation and are deposited on the membranes, causing loss in water output, salt rejection, or both. The membrane elements must be cleaned regularly to extend membrane life and to minimize loss of performance. Typically, reverse osmosis membranes are cleaned first at pH 12, or as high as pH 13, with a sodium hydroxide-based cleaner to remove organic fouling. This step is typically followed by a pH 2, or as low as pH 1, cleaning with citric acid or hydrochloric acid to remove scale.

To preserve the coating, membranes with a biguanide coating can only safely be cleaned with reagents with a pH as high as 11 and as low as pH 4, resulting in increased foulants and decreased performance. Thus, while performance of membranes post-treated with a boron rejection-enhancing agent is good initially, these membranes are not stable to the aggressive cleaning regimens that are typically used involving reagents with a pH higher than 12 and lower than 4. As a consequence, boron concentration levels tend to increase (and boron rejection values tend to decrease) as the coated RO membranes age.

Thus, there remains a need to develop TFC membranes, such as RO membranes, that achieve high boron rejection and remain stable over time, particularly to cleaning regimens, such as regimens that include reagents with high and low pH values, e.g., reagents having a pH of 12 or higher and/or 4 or lower. Also desired are methods for making the membranes. Accordingly, it is among the objects herein to provide TFC membranes, including RO membranes, that achieve high boron rejection values and remain stable over time, particularly after exposure to cleaning regimens that utilize reagents with high and low pH values, and methods for making the membranes.

SUMMARY

Accordingly, the present invention is directed to chemical additives for thin film composite membranes, such as reverse osmosis membranes, that increase the boron rejection capability of the membranes and the flux. The membranes provided herein remain stable over time, particularly after exposure to reagents having high or low pH values. The present invention substantially obviates one or more of the problems due to limitations and disadvantages of the related art.

In one aspect, processes for the production of TFC membranes having increased flux and boron rejection are provided, where the process includes providing a porous support membrane, and contacting on the porous support membrane a first solution containing a polyamine, such as 1,3-diaminobenzene (i.e., m-phenylenediamine (MPD)), and a boron rejection-enhancing additive that includes a biguanide compound, dicarbonate compound, pentathiodicarbonate compound, or salts thereof, with a second solution containing a polyfunctional acyl halide forms a trimesoyl chloride (TMC), where when the solutions are contacted, interfacial polymerization between the polyamine and the polyfunctional acid halide forms a discrimination layer on the porous support membrane of a highly permeable thin film composite membrane where the boron rejection-enhancing additive is fixed, or incorporated, e.g., covalently crosslinked, in the structure of the membrane. In addition, for increasing flux, an additive including a flux-enhancing additive that includes a metal chelate additive containing a bidentate ligand and a metal atom or metal ion is used with the boron rejection-enhancing additive. The membrane exhibits increased flux and boron rejection characteristics, for example, the membrane is characterized by exhibiting a boron rejection that is greater than the boron rejection of a membrane prepared in the absence of the boron rejection-enhancing additive.

The invention can provide an interfacial polymerization process for preparing a highly permeable TFC membrane, such as an RO membrane, including: contacting on a porous support membrane: a) a first solution containing 1,3-diaminobenzene; and b) a second solution containing trimesoyl chloride, where at least one of solutions a) or b) contains an additive that includes a biguanide compound, dicarbonate compound, pentathiodicarbonate compound, or salts thereof, for example, polyalkylene biguanide, polyalkylene dicarbonate, or polyalkylene pentathiodicarbonate compounds or salts thereof, e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt, or is a compound of the formula:

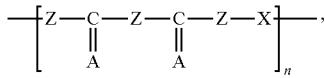

wherein the formula represents a recurring polymer unit; n is a number between 1 and 60, typically between 1 and 30, such as between 10 and 13; Z is a heteroatom such as S, O, or N (in the form of the NH group): A is a heteroatom such as S, O, or N (in the form of the NH group); and, optionally X, that when present is an alkyl chain having between 1 and 30 carbons, such as between 1 and 15 carbons, for example, between 2 and 8 carbons, e.g., 2, 3, 4, 5, 6, 7, or 8 carbons; and when the solutions are contacted recovering a highly permeable membrane. In some embodiments, the first solution includes a polar solvent. In some embodiments, the polar solvent includes water. In some embodiments, the first solution is an aqueous solution. In some embodiments, the first solution further includes a metal chelate additive containing a bidentate ligand and a metal atom or metal ion. In some embodiments, the additive that includes dicarbonate compound, pentathiodicarbonate compound, or salt thereof is in the first solution. In some embodiments, the combination of additives that includes a metal chelate additive containing a bidentate ligand and a metal atom or metal ion and a biguanide compound, dicarbonate compound, pentathiodicarbonate compound, or salt thereof is in the first solution. In some embodiments, the second solution includes a non-polar organic solvent. In some embodiments, the second solution further includes a metal chelate additive containing a bidentate ligand and a metal atom or metal ion. In some embodiments, the additive that includes dicarbonate compound, pentathiodicarbonate compound, or salt thereof is in the second solution. In some embodiments, the combination of additives that includes a metal chelate additive containing a bidentate ligand and a metal atom or metal ion and biguanide compound, dicarbonate compound, pentathiodicarbonate compound, or salt thereof is in the second solution. In some embodiments, one additive is in the first solution and one additive is in the second solution.

In some embodiments, the boron rejection-enhancing additive can have the formula:

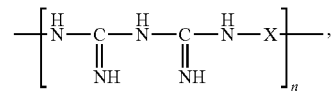

wherein the formula represents a recurring polymer unit; n is a number between 1 and 60; and X is an alkyl chain having between 1 and 30 carbons. In other embodiments, the boron rejection-enhancing additive can have the formula:

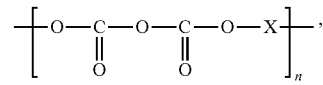

wherein the formula represents a recurring polymer unit; n is a number between 1 and 60; and X is an alkyl chain having between 1 and 30 carbons. In yet other embodiments, the boron rejection-enhancing additive can have the formula:

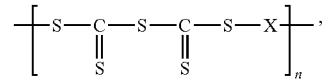

wherein the formula represents a recurring polymer unit; n is a number between 1 and 60; and X is an alkyl chain having between 1 and 30 carbons.

An advantage of the present invention is that the highly permeable TFC membranes, for example, RO membranes, produced by the provided methods can purify brackish water containing 2,000 ppm or less NaCl or seawater containing 32,000 ppm or less NaCl. For example, modules containing membranes produced using the processes described herein can be used to produce a stream of potable water from seawater at pressures of about 1000 psi or less, such as 800 psi or less.

Another advantage is the reduction in operating costs compared to standard desalination systems that typically require more than one pass to achieve an average boron rejection over 90%, the value typically required in order to produce permeate that meets the provisional WHO boron guidelines. Because the membranes exhibit enhanced boron rejection as compared to conventional seawater RO desalination installations, the operating costs are lower.

Additional features and advantages of the invention will be set forth in the description which follows, and in part will be apparent from the description, or may be learned by practice of the invention. The objectives and other advantages of the invention will be realized and attained by the structures particularly pointed out in the written description and claims hereof as well as the appended drawing.

Also provided are processes for preparing a thin film composite membrane, such as a reverse osmosis membrane. An exemplary process includes preparing an aqueous phase containing a polyamine and preparing an organic phase containing a polyfunctional acid halide, where the aqueous phase or organic phase or both further contain an additive that includes a boron rejection-enhancing additive that includes a biguanide compound, dicarbonate compound, pentathiodicarbonate compound, or salt thereof. The aqueous phase or organic phase or both may further include a metal chelate additive containing a bidentate ligand and a metal atom or metal ion. The process further includes applying the aqueous phase to the surface of a porous support membrane to form a coated support membrane, and applying the organic phase to the coated support membrane to interfacially polymerize the polyamine and the polyfunctional acid halide to form a discrimination layer of a thin film composite membrane, where the membrane includes the porous support membrane and the discrimination layer and the boron rejection-enhancing additive is fixed or incorporated, e.g., covalently crosslinked in the structure of the membrane. The discrimination layer can be a composite polyamide membrane prepared by coating a porous support membrane with a polyfunctional amine monomer, most commonly coated from an aqueous phase solution. Although water is a preferred polar solvent, other solvents, such as lower monohydric alcohols, ketones, and acetonitrile can be used. A polyfunctional acid halide subsequently can be applied to the support membrane, typically from an organic phase solution.

In some embodiments, the boron rejection-enhancing additive of the process provided herein can be a biguanide compound, dicarbonate compound, pentathiodicarbonate compound, or salts thereof that is present in the aqueous phase or organic phase in a concentration from about 0.01% to 5% based on the weight of the aqueous phase based on the weight of the aqueous phase or organic phase. In some embodiments, the boron rejection-enhancing additive can have the formula:

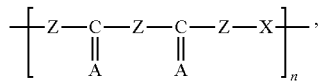

where the formula represents a recurring polymer unit, n is a number between 1 and 60, for example, between 1 and 30, such as between 10 and 13, Z is a heteroatom, for example, S, O, or N (in the form of the NH group), A is a heteroatom, for example, S, O, or N (in the form of the NH group), and, optionally, X, that when present is an alkyl chain having between 1 and 30 atoms, such as between 1 and 15 atoms, for example, between 1 and 10 carbons, for example, X can be $-(CH_2)_6-$. In the process provided herein, the boron rejection-enhancing additive can be selected from among polyalkylene biguanide, a polyalkylene biguanide salt, a polyalkylene dicarbonate, a polyalkylene dicarbonate salt, a polyalkylene pentathiodicarbonate, or a polyalkylene pentathiodicarbonate salt. In some embodiments of the process provided herein, the boron rejection-enhancing additive can be a polyhexamethylene biguanide (PHMB) or a PHMB salt, a polyhexamethylene dicarbonate or a polyhexamethylene dicarbonate salt, a polyhexamethylene pentathiodicarbonate or a polyhexamethylene pentathiodicarbonate salt, polyhexamethylene guanidine phosphate methylene single salt, p-chlorophenyl biguanide, 4-chlorobenzhydryl biguanide, or a halogenated hexidine selected from among chlorhexidine (1,1'-hexamethylene-bis-5-(4-chlorophenyl biguanide) and salts thereof.

In some embodiments, the polar solution is an aqueous phase containing a polyamine and is coated first on the porous support to form a coated support membrane, followed by applying the organic phase containing the acyl halide solution. The monomers can react when in contact, thereby polymerizing to produce a polymer (e.g., polyamide) discrimination layer at the upper surface of the support membrane. Interfacial polymerization of the polyamine and the polyfunctional acid halide forms a discrimination layer thereby forming a reverse osmosis (RO) membrane, where the RO membrane includes the porous support membrane and the discrimination layer. The thin film composite membrane prepared by the process can be characterized by having a boron rejection that is greater than the boron rejection of a membrane prepared in the absence of the boron rejection-enhancing additive or a membrane that is post-treated with the additive.

In some embodiments, the polyamine used in the process can be selected from the group consisting of diaminobenzene, triaminobenzene, m-phenylenediamine, p-phenylenediamine, 1,3,5-diaminobenzoic acid, 2,4-diaminotoluene, 2,4-diaminoanisole, xylylenediamine, ethylenediamine, propylenediamine, piperazine, and tris(2-diaminoethyl)amine. In some embodiments, the polyfunctional acid halide used in the process can be selected from the group consisting of trimesoyl chloride, trimellitic acid chloride, isophthaloyl chloride, and terephthaloyl chloride.

In some embodiments, the bidentate ligand used in the process can be selected from among:

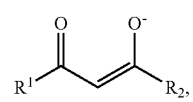

Formula V

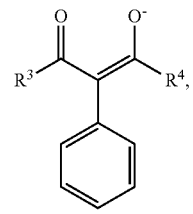

Formula VI

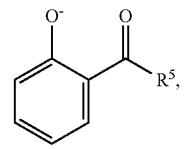

Formula VII

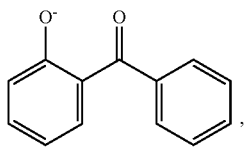

Formula VIII

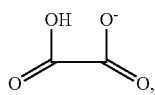

Formula IX

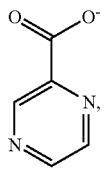

Formula X

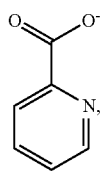

Formula XI where each of $R^1$, $R^2$, $R^3$, and $R^4$ and $R^5$ separately is a $C_1$-$C_6$ alkyl or a halogenated $C_1$-$C_6$ alkyl. The bidentate ligand can be an acetylacetonate (acac) or fluorinated acetylacetonate. In some embodiments, the metal chelate additive containing a bidentate ligand and a metal atom or metal ion can be selected from among Al(acac)$_3$, Al(F$_6$acac)$_3$, Be(acac)$_2$, Be(F$_6$acac)$_2$, Ca(acac)$_2$, Ca(F$_6$acac)$_2$, Cd(acac)$_2$, Cd(F$_6$acac)$_2$, Ce(acac)$_3$, Ce(F$_6$acac)$_3$, Cr(acac)$_3$, Co(acac)$_3$, Cu(acac)$_2$, Cu(F$_6$acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F$_6$acac)$_2$, Mn(acac)$_2$, Mn(acac)$_3$, MoO$_2$(acac)$_2$, MoO$_2$(F$_6$acac)$_2$, Na(acac), Nd(acac)$_3$, Nd(F$_6$acac)$_3$, Ni(acac)$_2$, Ni(F$_6$acac)$_2$, Pd(acac)$_2$, Pr(acac)$_3$, Pr(F$_6$acac)$_3$, Ru(acac)$_3$, Ru(F$_6$acac)$_3$, Sc(acac)$_2$, Sc(F$_6$acac)$_2$, Sm(acac)$_3$, Sn(acac)$_2$, Sn(acac)$_2$Cl$_2$, t-butyl-Sn (acac)$_2$, t-butyl-Sn(acac)$_2$Cl$_2$, Sn(F$_6$acac)$_2$, Sr(acac)$_2$, Sr(F$_6$acac)$_2$, Tb(acac)$_3$, V(acac)$_3$, Y(acac)$_3$, Y(F$_6$acac)$_3$, Zu(acac)$_3$, Zn(F$_6$acac)$_2$, and Zr(acac)$_4$, where F$_6$acac refers to 1,1,1,5,5,5-hexafluoroacetyl-acetonate. In some embodiments, the amount of bidentate ligand in the metal chelate additive yields a concentration of bidentate ligand in the aqueous phase or organic phase of from about 0.001 wt % to about 1 wt %, based on the weight of the phase.

In some embodiment, the bidentate ligand used in the process can be a beta-diketonate or a fluorinated beta-diketonate. For example, the bidentate ligand can be selected from among pentane-2,4-dionate 1,5-difluoro-pentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluoro-butane-1,3-dionate, 4,4,4-trifluorobutane-1,3-dionate, heptane-3,5-dionate, 1-fluoro-hexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoro-pentane-2,4-dionate, 1,1,1,5,5,5-hexa-fluoropentane-2,4-dionate and octane-3,5-dionate and combinations thereof.

In the processes provided herein, the metal atom or metal ion of the metal chelate additive can be selected from Group 2 or Group 13 of the periodic table. In some embodiments, the metal atom or metal ion is an alkaline earth metal. For example, the metal atom or metal ion can be selected from the group consisting of beryllium (Be), magnesium (Mg), calcium (Ca), strontium (Sr), and barium (Ba). In some embodiments, the metal atom or metal ion is selected from the group consisting of aluminum (Al), gallium (Ga), and indium (In).

In some embodiments, the amount of metal atom or metal ion in the metal chelate additive yields a concentration of metal atom or metal ion in the aqueous phase or the organic phase of from about 0.00001 wt % to about 1 wt %, based on the weight of the aqueous phase of the organic phase. In some embodiments, the amount of metal chelate additive added to the aqueous phase or organic phase yields a concentration of metal chelate additive in the aqueous phase or the organic phase of from about 0.001 wt % to about 1 wt %, based on the weight of the aqueous phase of the organic phase.

The process further can include adding a processing aid selected from among a surfactant, a co-solvent, a drying agent, a catalyst or any combination thereof to the aqueous phase or organic phase or both prior to applying the aqueous phase or organic phase to the porous support membrane. The amount of processing aid in the aqueous phase or organic phase can be from about 0.01 wt % to about 10 wt % based on the weight of the aqueous phase or organic phase.

In some embodiments, the process further includes adding a surfactant to the aqueous phase prior to applying the aqueous phase to the porous support membrane. The surfactant can be selected from among nonionic, cationic, anionic, and zwitterionic surfactants. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyltrimethyl ammonium bromide or chloride, hexadecyltrimethyl ammonium bromide or chloride, and alkyl betaines. Preferred among these are sodium lauryl sulfate (SLS), an alkyl poly(ethylene oxide), e.g., a polyoxyethylene oleyl ether, an octylphenol ethoxylate, and an ethoxylated nonylphenol. When present, the amount of surfactant in the aqueous phase can be from about 0.005 wt % to about 0.5 wt % based on the weight of the aqueous phase.

The co-solvent can be a polar aprotic solvent. Exemplary polar aprotic solvents include dimethylformamide dimethylacetamide, tetrahydrofuran, dimethyl sulfoxide, 1,3-dimethyl-2-imidazolidinone diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof.

The processing aid can include a drying agent. A drying agent can be included in order to prevent loss of permeation of the discrimination layer upon drying. Any drying agent that does not interfere with the interfacial polymerization can be used. Exemplary drying agents include a hydrocarbon, an ether, glycerin, citric acid, a glycol, glucose, sucrose, triethylanunonium camphorsulfonate, triethyl-ammonium benzenesulfonate, triethylammonium toluenesulfonate, triethylammonium methane sulfonate, ammonium camphor sulfonate, and ammonium benzene sulfonate and any combination thereof. When present, a drying agent can be present in the aqueous phase in an amount from about 2 wt % to about 10 wt %, based on the weight of the aqueous phase.

In some embodiments, the process can include a catalyst in the aqueous phase or organic phase or both. The catalyst can be selected from among acid and base catalysts and organic catalysts. Exemplary catalysts include hydrochloric acid, nitric acid, sulfuric acid, an aliphatic sulfonic acid, an aromatic sulfonic acid, a carboxylic acid, a fluorinated carboxylic acid, such as trifluoroacetic acid, a cycloaliphatic sulfonic acid, boric acid, tetrafluoroboric acid, aluminum trihalide, an aluminum trialkoxide, a boron trihalide, such as a boron trifluoride, a tin tetrahalide, such as tin tetrachloride, zinc tetrafluoroborate, alkoxide salts, such as sodium ethoxide, hydroxide salts, such as sodium hydroxide and potassium hydroxide, carbonate salts, such as potassium carbonate, phosphate salts, such as trisodium phosphate, phenoxide salts, such as sodium phenoxide, borate salts, such as sodium borate, carboxylate salts, such as potassium acetate, ammonia, and primary, secondary and tertiary amines, and combinations thereof. When present, a catalyst can be present in the aqueous phase or organic phase or both in an amount from about 0.001 wt % to about 0.5 wt % based on the weight of the aqueous phase or organic phase.

In some embodiments, the process can include an organic phase that includes one or more non-polar liquids. Exemplary non-polar liquids include isoparaffinnic solvents, trimethylbenzenes, tetramethylbenzenes, pentamethylbenzene, hexamethylbenzene, diisopropylbenzenes, triisopropylbenzenes, tetraisopropylbenzenes, and combinations thereof.

In the processes provided herein, the aqueous phase or the organic phase or both can include nanoparticles. The nanoparticles can be zeolites or carbon nanoparticles (e.g., fullerenes or carbon nanotubes) or combinations thereof. When present, the nanoparticles can be in the aqueous phase or in the organic phase or both in an amount from about 0.001 wt % to about 0.5 wt % based on the weight of the solution.

Provided are processes that further include coating one or both surfaces of the membrane after membrane formation. In some instances, the coating is an aqueous solution of a water-soluble organic polymer. In other instances, the coating is an aqueous solution of sodium citrate. In yet other instances, the coating is one of each of an aqueous solution of a water-soluble organic polymer and an aqueous solution of sodium citrate. For example, provided herein are processes where one surface of the membrane is coated with an aqueous solution of a water-soluble organic polymer that is a polyvinyl alcohol and the other surface is coated with an aqueous solution of sodium citrate.

Also provided herein are processes for preparing a thin film composite membrane, such as a reverse osmosis membrane, that involve preparing an aqueous phase that contains a polyamine for example, m-phenylene diamine, that is present in an amount of from about 0.5 wt % to 6 wt %, based on the weight of the aqueous phase; preparing an organic phase that contains a polyfunctional acid halide, for example, trimesoyl chloride, that is present in an amount of from about 0.01 wt % to 10 wt %, based on the weight of the organic phase; the aqueous phase or the organic phase or both contain a flux-enhancing additive, for example, a metal chelate additive containing a bidentate ligand and a metal atom or metal ion, that is present in an amount of from 0.001 wt % to 1 wt %, based on the weight of the aqueous phase or organic phase, and a boron rejection-enhancing additive, for example, polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt, that is present in an amount of from about 0.01 wt % to 5 wt %, based on the weight of the aqueous phase or organic phase; applying the aqueous phase to a surface of a porous support membrane to form a coated support membrane; and applying the organic phase to the coated support membrane to interfacially polymerize the polyamine and the polyfunctional acid halide to form a discrimination layer of a thin film composite membrane that includes the porous support membrane and the discrimination layer, where the thin film composite membrane is characterized by having a boron rejection that is greater than the boron rejection of a membrane prepared in the absence of the boron rejection-enhancing additive and the boron rejection-enhancing additive is fixed or incorporated. e.g., covalently crosslinked in the structure of the membrane. In an exemplary embodiment, the polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt is present in the aqueous phase.

Also provided are thin film composite membranes, such as reverse osmosis membranes, prepared according to the processes provided herein. The reverse osmosis membranes can include a discrimination layer formed on a surface of the support membrane by interfacially polymerizing a polyamine and a polyfunctional acid halide, where a boron rejection-enhancing additive is fixed in the structure of the membrane. In some instances, the membrane can exhibit a flux of at least 10 gfd, such as at least 11 gfd, 12 gfd, 13 gfd, 14 gfd, 15 gfd, 16 gfd, 17 gfd, 18 gfd, or more, such as between or between about 9 gfd and 20 gfd, determined by exposing the membrane to deionized water containing 32,000 ppm NaCl at a temperature of 25° C. and a pressure of 800 psi. In some instances, the membrane can exhibit a total dissolved solids rejection of at least 99%, such as between or between about 99.1% and 99.9%, for example, between or between about 99.5% and 99.9%, determined by exposing the membrane to deionized water containing 32,000 ppm NaCl at a temperature of 25° C. and a pressure of 800 psi. In some instances, the membrane can exhibit a boron rejection of at least 90%, such as at least 91%, 92%, 93%, 94%, 95%, or more, such as between or between about 91% and 96% boron rejection, determined by exposing the membrane to deionized water containing 32,000 ppm NaCl at a temperature of 25° C. and a pressure of 800 psi. In some instances, the boron rejection is measured after operation of the membrane to process seawater for 1 week, 2 weeks, 3 weeks, 4 weeks, or more.

Also provided are methods of purifying seawater or brackish water. The seawater can contain 32,000 ppm or less NaCl. In some instances, the methods include contacting seawater with a thin film composite membrane prepared by the processes described herein. A hydrostatic pressure is applied to the membrane by the water to be purified. In some instances, a hydrostatic pressure of about 800 psi or less is applied to the membrane via the seawater or brackish water Using membranes prepared by the methods provided herein, the methods of purifying seawater or brackish water can produce a flux of between or between about 9 gfd and 20 gfd, such as at least 10 gfd, 11 gfd, 12 gfd, 13 gfd, 14 gfd, 15 gfd, 16 gfd, 17 gfd, 18 gfd, 19 gfd, or more.

Also provided are reverse osmosis elements that include a reverse osmosis membrane prepared by any of the methods described herein. In the element, the reverse osmosis membrane can be spirally wound around a central porous permeate collection tube.

BRIEF DESCRIPTION OF THE DRAWINGS

The accompanying drawing, which is included to provide a further understanding of the invention and is incorporated in and constitutes a part of this specification, illustrates an embodiment of the invention and together with description serves to explain the principles of the invention.

In the drawings.

DETAILED DESCRIPTION

A. Definitions

Figure 1:
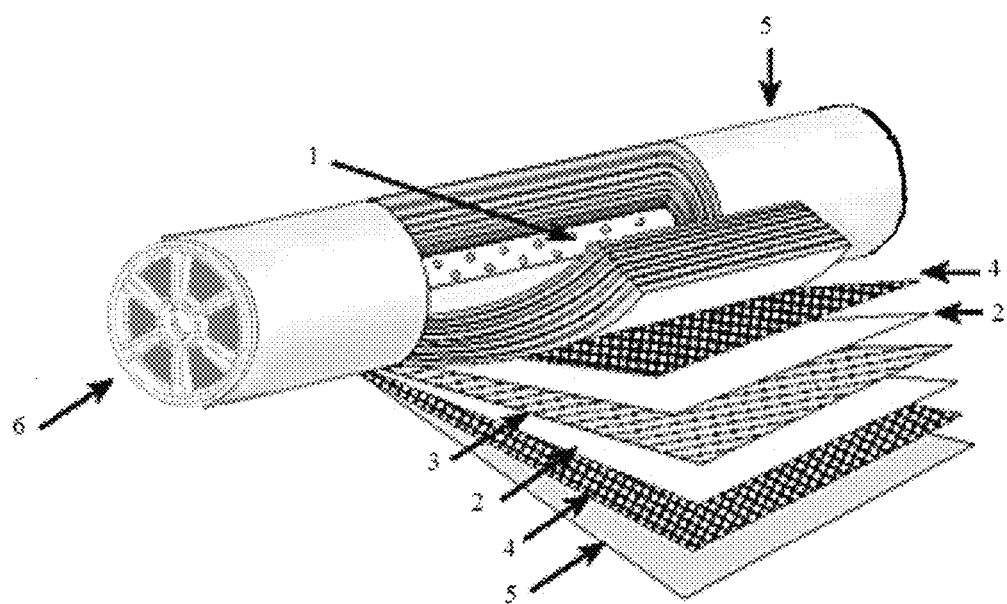
FIG. 1 is an exemplary embodiment of a spiral wound module.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "alkyl" refers to a straight, branched, or cyclic chain containing at least one carbon atom and no double or triple bonds between carbon atoms. The number of carbon atoms can be specified, for example, 1 to 6 carbon atoms, 2 to 5 carbon atoms, 3 to 4 carbon atoms, 2 to 6 carbon atoms, 3 to 6 carbon atoms, 2 to 4 carbon atoms and 1 to 5 carbon atoms. The number of carbon atoms can be represented, e.g., as $C_1$-$C_6$.

As used herein, "$C_1$-$C_x$" includes $C_1$-$C_2$, . . . $C_1$-$C_x$. For example, "$C_1$-$C_6$" refers to an alkyl that includes $C_1$-$C_2$, $C_1$-$C_3$, $C_1$-$C_4$, $C_1$-$C_5$, and $C_1$-$C_6$.

As used herein, "aromatic: ring" refers to a:ring containing an array of π-molecular orbitals occupied by 4n+2 electrons, where n is an integer. Many aromatic rings or ring systems have 6 π-electrons. The aromatic ring can be a 5- or 6-membered monocyclic ring, or can be a bicyclic system, containing two or more fused 5- or 6-membered rings.

As used herein, a "boron rejection-enhancing compound" or "boron rejection-enhancing additive" refers to at least one component that improves the boron-rejecting ability of a membrane as compared to a membrane that does not contain the component.

As used herein, "fixed" or "incorporated" refer to one component that is chemically joined to another component by a covalent bond. A component can become fixed or incorporated in the structure of another component by, e.g., crosslinking, the process of chemically joining two or more components by a covalent bond. For example, a boron rejection-enhancing additive can become fixed in the structure of the TFC membrane by covalent crosslinking.

As used herein, "flux" refers to the amount of material that flows through a unit area per unit time, such as the amount of liquid flowing through a given membrane area during a given time. Generally, flux depends on the thickness of the membrane, the feed composition, the temperature of the feed, the downstream vacuum, and the feed-side pressure.

As used herein, a "combination" refers to any association between two items or among more than two items. The association can be spatial or refer to the use of the two or more items for a common purpose.

As used herein, a "flax-enhancing additive" refers to at least one component that improves the flux of a membrane.

As used herein, the term "surfactant" refers to molecules that absorb at the air/water, air/oil and/or oil/water interfaces, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, "halogenated" refers to the presence of one or more halogen substituents, such as fluorine, chlorine, bromine, or iodine or any combination thereof. For example, a halogenated $C_1$ alkyl can be any of $CH_2Cl$, $CHCl_2$, $CCl_3$, $CH_2F$, $CHF_2$, $CF_3$, $CH_2Br_2$, $CHBr_2$, $CBr_3$, $CH_2I$, $CHI_2$, or $CI_3$.

As used herein, the term "contacting" refers to bringing two or more materials into close enough proximity whereby they can interact.

As used herein, "gfd" refers to gallons/$ft^2$/day.

B. THIN FILM COMPOSITE MEMBRANES CONTAINING BORON REJECTION-ENHANCING ADDITIVE AND FLUX-ENHANCING AND BORON REJECTION-ENHANCING ADDITIVES

Provided are thin film composite (TFC) membranes produced by interfacial polymerization of monomers in two immiscible phases, e.g., a monomer in a non-polar (i.e., organic) phase with a monomer in a polar (i.e., aqueous) phase, on a porous support membrane, and methods of preparing the TFC membranes. The provided TFC membranes contain one or more additives in the aqueous phase or organic phase or both of the interfacial polymerization reaction. By virtue of the presence of the additives in the aqueous phase or organic phase or both, e.g., a boron rejection-enhancing additive, the additive can become fixed in the TFC membrane, e.g., covalently crosslinked, and the TFC membrane exhibits advantageous properties, such as, for example, enhanced boron rejection and stability of the membrane over time, particularly after the membrane has been exposed to reagents having high and low pH values, e.g., higher than pH 11 and/or lower than pH 4, such as those employed in typical cleaning regimens. The TFC membranes provided herein that can be prepared by incorporating one or more boron rejection-enhancing additives in the aqueous phase or organic phase or both of the interfacial polymerization reaction exhibit greater boron rejection values than the same membranes prepared in the absence of the additive or the same membranes post-treated with the additive. The TFC membranes described herein also exhibit greater boron rejection values over time after exposure to cleaning regimens that employ reagents with pH values lower than or lower than about 4 or higher than or higher than about 11 as compared to the same membranes prepared in the absence of the additive or the same membranes post-treated with the additive. The TFC membranes described herein also can be prepared by incorporating one or more flux-enhancing additives in the aqueous phase or organic phase or both of the interfacial polymerization reaction and exhibit greater flux than the same membranes prepared in the absence of the additive.

In particular, the TFC membranes provided herein can contain one or more flux-enhancing additives, such as a metal chelate additive containing a bidentate ligand and a metal atom of metal ion, and one or more boron rejection-enhancing additives in the aqueous phase or organic phase or both of the interfacial polymerization reaction that produces the TFC membranes. For example, the boron rejection-enhancing additive can be a biguanide compound, dicarbonate compound, pentathiodicarbonate compound, or salts thereof, for example, polyalkylene biguanide, polyalkylene dicarbonate, or polyalkylene pentathiodicarbonate compounds or salts thereof, e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt. In some embodiments, the additives can be added to the aqueous phase. In some embodiments, the additives can be added to the organic phase. In some embodiments, the additives can be added to the aqueous phase and the organic phase.

The TFC membranes are produced by interfacial polymerization of a polyamine monomer in the aqueous phase with a polyfunctional acyl halide monomer in the organic phase on a porous support membrane to form a thin selective layer on top of the substrate. The aqueous phase or organic phase or both can contain between 0.01 wt % and 5.0 wt % of a boron rejection-enhancing additive, such as a biguanide compound, dicarbonate compound, pentathiodicarbonate compound, or salts thereof and between 0.001 wt % and 1 wt % of a flux-enhancing additive, such as a metal chelate additive containing a bidentate ligand and a metal atom or metal ion. The use of the additives in the aqueous phase or organic phase or both of the interfacial polymerization reaction results in a TFC membrane that exhibits enhanced flax and enhanced boron rejection and remains stable after exposure to cleaning regimens that employ reagents with high or low pH values as compared to the same TFC membrane that does not contain the additive in the aqueous phase or organic phase of the interfacial polymerization reaction or a TFC membrane that is post-treated with the additive. Further description and examples of the TFC membranes and methods of producing the membranes are provided below.

It is shown herein that the TFC membranes described herein that can be prepared by including a boron rejection-enhancing additive or both with a flux-enhancing additive and a boron rejection-enhancing additive in the aqueous phase or organic phase or both of the interfacial polymerization reaction have advantageous properties compared to the TFC membranes that are prepared in the absence of the flux-enhancing additive or boron rejection-enhancing additive or membranes that are coated with the boron rejection-enhancing additive after the membrane has formed (i.e., post-treated). In particular, the TFC membranes provided herein can incorporate the boron rejection-enhancing additive, such as a biguanide compound, dicarbonate compound, pentathiodicarbonate compound, or salts thereof, into the structure of the membrane, e.g., covalently crosslink, by adding it to the aqueous phase or organic phase during the interfacial polymerization reaction. The provided TFC membranes can exhibit advantageous properties, such as high flux, high boron rejection, and stability of the membrane over time after exposure to reagents having high and low pH values, such as after exposure to cleaning regimens that incorporate reagents of high and low pH values, such as below or below about pH 4 and above or above about pH 11.

In addition, provided herein are methods of producing thin film composite membranes, such as via interfacial polymerization, that can include a flux-enhancing additive, for example, a metal chelate additive containing a bidentate ligand and a metal atom or metal ion, and a boron rejection-enhancing additive, for example, a biguanide compound, dicarbonate compound, pentathiodicarbonate compound, or salts thereof, in the aqueous phase or organic phase or both of the interfacial polymerization reaction that produce membranes that incorporate the boron rejection-enhancing additive into the structure of the membrane, e.g., covalently crosslink. Thus provided herein are methods of producing such TFC membranes, such as methods that can include addition of a flux-enhancing additive, such as a metal chelate additive containing a bidentate ligand and a metal atom or metal ion, and a boron rejection-enhancing additive, such as a biguanide compound, dicarbonate compound, pentathiodicarbonate compound, or salts thereof, in the aqueous phase or organic phase or both of an interfacial polymerization reaction on a porous support membrane, to produce TFC membranes that have enhanced flux and enhanced boron rejection characteristics when used, for example, in the purification of water, such as tap water, brackish water or seawater, as compared to TFC membranes that do not contain the additives or TFC membranes post-treated with the boron rejection-enhancing additive.

1. Boron Rejection-Enhancing Additive

The TFC membranes provided herein, for example, reverse osmosis membranes, contain one or more additives in the aqueous phase or organic phase or both of the interfacial polymerization reaction that forms the TFC membrane. An exemplary additive is a boron rejection-enhancing additives. Boron rejection-enhancing additives include biguanide compounds, dicarbonate compounds, pentathiodicarbonate compounds, the polymeric forms, and salts thereof. Suitable biguanide compounds, dicarbonate compounds, pentathiodicarbonate compounds or salts thereof, for use in the membranes and methods provided herein include any biguanide compound, dicarbonate compound or pentathiodicarbonate compound that, when incorporated into the TFC membrane, for example, covalently crosslinked, improves the boron rejection performance of the membrane as compared to the same TFC membrane prepared in the absence of the compound. Exemplary boron rejection-enhancing additives include biguanide salts, dicarbonate salts, and pentathiodicarbonate salts, e.g., polyalkylene biguanide, polyalkylene dicarbonate, or polyalkylene pentathiodicarbonate salts.

The boron rejection-enhancing compounds suitable for use in the TFC membranes provided herein include compounds having the following general formula I:

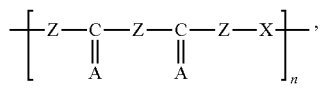

where formula I represents a recurring polymer unit where n is a number equal to or greater than 1, generally between or between about 1 and 60, and typically between or between about 1 and 30, for example, n typically has an average value such that the molecular weight of the biguanide compound corresponds to where n is between or between about 10 and 13, for example, the molecular weight is between or between about 200 and 8,000, but can be higher or lower; Z is a heteroatom, for example, Z can be S, O, or N (in the form of the NH group); A is a heteroatom capable of forming a double bond with carbon, for example. A can be O, S, or N (in the form of the NH group); and, optionally, X, that when present is an alkyl chain having 1-30 carbon atoms, such as between 1 and 15 carbon atoms, and typically between 4 and 8 atoms, such as 1, 2, 3, 4, 5, 6, 7, 8, 9, or 10 carbon atoms, where X can be a saturated alkyl (i.e., —$CH_2$—) or X can be a halogenated alkyl.

The boron rejection-enhancing compound can be modified or derivatized with other functional groups, such as hydroxy, amine, halogen, epoxy, alkyl or alkoxy silyl functionalities to enable direct immobilization to a surface. The boron rejection-enhancing compound can be the free base or can be the salt, including salts with an inorganic acid, such as hydrochloride, hydrofluoride, nitrate, sulfate, bisulfate and/or phosphate, and/or salts with an organic acid, such as carboxylic acid (carbonate), bicarbonate, acetate, benzoate, tartrate, adipate, lactate, formate, maleate, glutamate, ascorbate, citrate, gluconate, oxalate, succinate, pamoate, salicylate, isethionate, succinimate, mono-diglycolate, dimethanesulthnate, diisobutyrate, and/or glucoheptonate, or can be in an aqueous solution.

In some embodiments, the boron rejection-enhancing compound can be a biguanide compound or salt thereof. For example, the boron rejection-enhancing compound can have the following formula II:

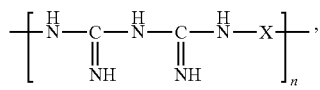

where X is optional, and, when present, is an alkyl chain having between 1 and 30 carbons. In some embodiments the biguanide compounds for use in the membranes and methods provided herein are polyalkylene biguanides and salts thereof, represented by formula I above, where Z is a heteroatom represented by N (in the form of the NH group), A is a heteroatom represented by N (in the form of the NH group), and X is an alkyl chain with between 1 and 10 carbons, typically between 2 and 10, such as between 2 and 8 or 4 and 7, for example, 1, 2, 3, 4, 5, 6, 7, 8, 9, or 10 carbons. An exemplary polyalkylene biguanide is polyhexamethylene biguanide (PHMB), and salts thereof, such as PHMB hydrochloride. Polyhexamethylene biguanides, also known as polyhexanide and polyaminopropyl biguanide, are compounds represented by formula I above in which Z is a heteroatom represented by N (in the form of the NH group), A is a heteroatom represented by N (in the form of the NH group), and X is a polyalkylene chain represented by the —$(CH_2)_6$— group. An exemplary PHMB includes the PHMB sold as a 20 wt % aqueous solution, such as the PHMB sold by Arch Chemical, Norwalk, Conn.

PHMB is an antimicrobial compound with fast-acting properties that is applied in a variety of applications that include eye and skin treatment compositions (U.S. Pat. Nos. 7,569,212; 7,560,421); antimicrobial hand washes; cleaning compositions (U.S. Pat. Nos. 7,511,006; 7,501,027; 7,494,963); preservatives, such as in cosmetics, personal care products, fabric softeners, contact lens solutions, and hand washes (U.S. Pat. No. 7,537,776); air filter treatments as an alternative to ozone; and as a treatment (sanitizer) for water systems, such as in pools and spas (U.S. Pat. No. 6,710,017). PHMB can be used as a sanitizer or preservative to kill viruses and bacteria (including methicillin-resistant *Staphylococcus aureus* (MRSA), *Salmonella, Campylobacter*, and *E. coli*) and to control algae in a wide range of applications, including controlling odor in textiles; preventing microbial contamination in wound irrigation and sterile dressings; disinfecting medical and dental utensils and trays, farm equipment, animal drinking water, and hard surfaces for food handling institutions and hospitals; and to deodorize vacuums and toilets.

Other suitable biguanide compounds include, but are not limited to, polyhexamethylene guanidine phosphate methylene single salt, p-chlorophenyl biguanide, 4-chlorobenzhydryl biguanide, halogenated hexidines such as, but not limited to, chlorhexidine (1,1'-hexamethylene-bis-5-(4-chlorophenyl biguanide)) and salts thereof.

In some embodiments, the boron rejection-enhancing compound can be a dicarbonate compound or salt thereof. For example, the boron rejection-enhancing compound can have the following formula III:

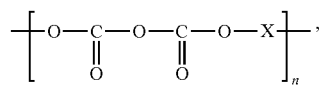

where X is optional, and, when present, is an alkyl chain having between 1 and 30 carbons. In some embodiments the dicarbonate compounds for use in the membranes and methods provided herein are polyalkylene dicarbonates and salts thereof, represented by formula I above, where Z is a heteroatom represented by O, A is a heteroatom represented by O, and X is an alkyl chain with between 1 and 10 carbons, typically between 2 and 10, such as between 2 and 8 or 4 and 7, for example, 1, 2, 3, 4, 5, 6, 7, 8, 9, or 10 carbons. An exemplary polyalkylene dicarbonate is polyhexamethylene dicarbonate, and salts thereof, such as polyhexamethylene dicarbonate hydrochloride. Polyhexamethylene dicarbonates are compounds represented by the formula I above in which Z is a heteroatom represented by O, A is a heteroatom represented by O, and X is a polyalkylene Chain represented by the —$(CH_2)_6$— group.

In some embodiments, the boron rejection-enhancing compound can be a pentathiodicarbonate compound or salt thereof. For example, the boron rejection-enhancing compound can have the following formula IV:

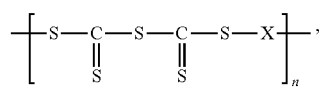

where X is optional, and, when present, is an alkyl chain having between 1 and 30 carbons. In some embodiments the pentathiodicarbonate compounds for use in the membranes and methods provided herein are polyalkylene pentathiodicarbonates and salts thereof, represented by formula I above, where Z is a heteroatom represented by S, A is a heteroatom represented by S, and X is an alkyl chain with between 1 and 10 carbons, typically between 2 and 10, such as between 2 and 8 or 4 and 7, for example, 1, 2, 3, 4, 5, 6, 7, 8, 9, or 10 carbons. An exemplary polyalkylene pentathiodicarbonate is polyhexamethylene pentathiodicarbonate, and salts thereof, such as polyhexamethylene pentathiodicarbonate hydrochloride. Polyhexamethylene pentathiodicarbonates are compounds represented by the formula I above in which Z is a heteroatom represented by S, A is a heteroatom represented by S, and X is a polyalkylene chain represented by the —$(CH_2)_6$— group.

The boron rejection-enhancing compound, for example, the polyalkylene biguanide, polyalkylene dicarbonate, or polyalkylene pentathiodicarbonate compounds or salts thereof, can be employed as a water-soluble salt. Such cationic salts can include water-soluble salts of common inorganic and organic acids such as chlorides, bromides, nitrates, sulfates, bisulfates, acetates, and gluconates. In one example, the boron rejection-enhancing compound is a biguanide compound that is polyhexamethylene biguanide hydrochloride. Exemplary of a water-soluble salt of a biguanide compound includes the polyhexamethylene biguanide sold as a 20% aqueous solutions of PHMB (hydrochloride salt) under the trade names Cosmocil™ CQ and Vantocil™ IB (Arch Chemical; Norwalk, Conn.). In another example, the boron rejection-enhancing compound is a dicarbonate compound that is polyhexamethylene dicarbonate hydrochloride. In yet another example, the boron rejection-enhancing compound is a pentathiodicarbonate compound that is polyhexamethylene pentathiodicarbonate hydrochloride.

The amount of boron rejection-enhancing compound, such as a biguanide compound, dicarbonate compound, pentathiodicarbonate compound, or salts thereof, for example, a polyalkylene biguanide, polyalkylene dicarbonate, or polyalkylene pentathiodicarbonate compound or salts thereof, e.g., polyhexamethylene biguanide, polyhexamethylene dicarbonate, or polyhexamethylene pentathiodicarbonate and salts thereof, included in the aqueous phase or organic phase or both of the interfacial polymerization reaction is between or between about 0.01 wt % and 5 wt %, inclusive, such as between or between about 0.01% and 0.05%, 0.01% and 0.1%, 0.01% and 0.5%, 0.01% and 1%, 0.01% and 1.5%, 0.01% and 2%, 0.01% and 2.5%, 0.01% and 3%, 0.01% and 3.5%, 0.01% and 4%, 0.01% and 4.5%, 0.01% and 5%, 0.05% and 0.1%, 0.05% and 0.5%, 0.05% and 1%, 0.05% and 1.5%, 0.05% and 2%, 0.05% and 2.5%, 0.05% and 3%, 0.05% and 3.5%, 0.05% and 4%, 0.05% and 4.5%, 0.05% and 5%, 0.1% and 0.5%, 0.1% and 1%, 0.1% and 1.5%, 0.1% and 2%, 0.1% and 2.5%, 0.1% and 3%, 0.1% and 3.5%, 0.1% and 4%, 0.1% and 4.5%, 0.1% and 5%, 0.5% and 1%, 0.5% and 1.5%, 0.5% and 0.5% and 2.5%, 0.5% and 0.3%, 0.5% and 3.5%, 0.5% and 4%, 0.5% and 4.5%, 0.5% and 5%, 1% and 1.5%, 1% and 2%, 1% and 2.5%, 1% and 3%. 1% and 3.5%, 1% and 4%, 1% and 4.5%, 1% and 5%, 1.5% and 2%, 1.5% and 2.5%, 1.5% and 3%, 1.5% and 3.5%, 1.5% and 4%, 1.5% and 4.5%, 1.5% and 5%, 2% and 2.5%, 2% and 3%, 2% and 3.5%, 2% and 4%, 2% and 4.5%, 2% and 5%, 2.5% and 3%, 2.5% and 3.5%, 2.5% and 4%, 2.5% and 4.5%, 2.5% and 5%, 3% and 1.5%, 3% and 4%, 3% and 4.5%, 3% and 5%, 1.5% and 4%, 3.5% and 4.5%, 3.5% and 5%, 4% and 4.5%, 4% and 5%, and 4.5% and 5% boron rejection-enhancing compound or salt thereof, by weight of the aqueous phase or organic phase. The aqueous phase or organic phase or both can contain less than 5 wt % boron rejection-enhancing compound or salt thereof, such as less than 3 wt %, typically less than 1 wt %. For example, the aqueous phase or organic phase or both of the interfacial polymerization reactions described herein can contain at least or about at least 0.01%, 0.025%, 0.05%, 0.075%. 0.1%, 0.15%, 0.25%, 0.5%, 0.75%, 1%, 1.5%, 2%, 2.5%, 3%, 3.5%, 4%, 4.5%, but less than at or about 5 wt % boron rejection-enhancing compound or salt thereof.

2. Metal Chelate Additive

The TFC membranes provided herein, for example, reverse osmosis membranes, contain one or more additives in the aqueous phase or organic phase or both of the interfacial polymerization reaction that forms the TFC membrane. An exemplary additive is a metal chelate additive containing a bidentate ligand and a metal atom or metal ion. The metal chelate additive containing a bidentate ligand and a metal atom or metal ion can be included in the aqueous phase of the interfacial polymerization reaction mixture to form the TFC membrane. Any bidentate ligand that can form a complex with a metal atom or metal ion can be used in the metal chelate additive. A bidentate ligand can be a Lewis base that can donate electrons to a metal atom. Exemplary bidentate ligands include:

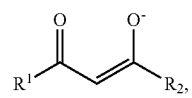

Formula V

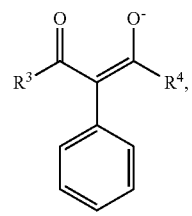

Formula VI

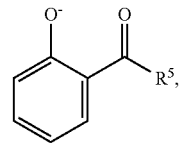

Formula VII

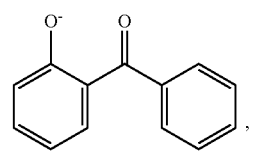

Formula VIII

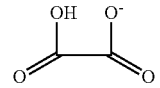

Formula IX

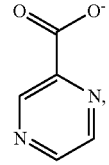

Formula X

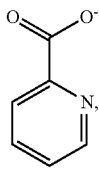

Formula XI where each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. In some embodiments, each of $R^1$, $R^2$, $R^3$, $R^4$ and $R^5$ separately is selected from among $C_1$-$C_6$ alkyl and halogenated $C_1$-$C_6$ alkyl. In some embodiments, any one of $R^1$, $R^2$, $R^3$, $R^4$ or $R^5$ can be selected from among phenyl, benzyl, a $C_1$-$C_6$, aromatic ring containing 1 to 4 hetero atoms selected from among N, O and S, and a $C_5$-$C_9$ bicyclic aromatic ring system containing 1 to 4 hetero atoms selected from among N, O and S. In some embodiments, any one of $R^1$, $R^2$, $R^3$, $R^4$ or $R^5$ can be selected from among furanyl, pyrrolyl, thiopheneyl, imidazolyl, pyrazolyl, oxazolyl, isoxazolyl, thiazolyl, phenyl, pyrazinyl, pyrimiclinyl, pyridazinyl, purinyl, benzoxazolyl, benzothiazolyl, benzisoxazolyl, benzimidazolyl, benzothiopheneyl, indazolyl, benzo[c]thiopheneyl, isoindolyl, isobenzofuranyl, napthaleneyl, quinolinyl, quinoxalinyl, quinazaolinyl, and isoquinolinyl.

Among the preferred bidentate ligands are the unsubstituted and halogen-substituted beta-diketonates of Formula 1, such as an acetylacetonate ion (often abbreviated as "acac" and also known as pentane-2,4-dionate) or halogenated acetylacetonate ion. One or more bidentate ligands can interact with a metal ion to form a metal chelate. For example, when the metal ion is an alkaline earth metal, two bidentate ligands can interact with the metal to form a metal chelate. Exemplary metal chelate additives include i) two acetylacetonate ligands and a Sr atom; ii) two fluoroacetylacetonate ligands and a Sr atom; and iii) two oxalate ligands and a Sr atom.

In some embodiments, the metal species and the ligands are selected to form a chelate that is dissolvable to some extent in the aqueous phase layer. In some applications, the chelate includes at least one bidentate ligand.

In some embodiments, the metal complex includes an unsubstituted or halogen-substituted beta-diketonate. Exemplary beta-diketonate ligands include pentane-2,4-dionate (acetylacetonate, often abbreviated as "acac"); 1,5-difluoropentane-2,4-dionate; 1,1,5,5-tetrafluoropentane-2,4-dionate; 1,1,1,5,5,5-hexafluoro-pentane-2,4-dionate; propane-1,3-dionate; butane-1,3-dionate; 4-fluorobutane-1,3-dionate; 4,4-difluorobutane-1,3-dionate; 4,4,4-trifluorobutane-1,3-dionate; heptane-3,5-dionate; 1-fluorohexane-2,4-dionate; 1,5-difluoropentane-2,4-dionate;. 1,1,5-trifluoropentane-2,4-dionate; 1,1,5,5-tetrafluoro-pentane-2,4-dionate; 1,1,1,5,5-pentafluoropentane-2,4-dionate; 1,1,1,5,5,5-hexatluoropentane-2,4-dionate; and octane-3,5-dionate ligands.

The ligand can be bound to any element selected from Groups 2-15 of the Periodic Table (RiPAC) to form the chelate. In some enibodiments, the ligand is bound to an element selected from among Groups 3-15 and Rows 3-6 of the Periodic Table (IUPAC), preferably Groups 3-14 and Rows 3-6 of the Periodic Table, In some embodiments, the ligand is bound to a metal ion selected from among the group consisting of aluminum, beryllium, cadmium, calcium, cerium, chromium, cobalt, copper, dysprosium, erbium, gallium, hafnium, indium, iron, lithium, magnesium, manganese, molybdenum, neodymium, nickel, palladium, potassium, praseodymium, ruthenium, samarium, scandium, sodium, strontium, terbium, tin, vanadium, yttrium, ytterbium, zinc, and zirconium. In some embodiments, the metal can be a Group 2 (alkaline earth, such as beryllium (Be), magnesium (Mg), calcium (Ca), strontium (Sr), and barium (Ba)), or Group 13 (aluminum (Al), gallium (Ga), indium (In) or thallium (Tl)) metal ion or atom.

Metal chelates containing bidentate ligands and metal atoms or metal ions are well blown in the art, as are methods for forming the metal chelates (e.g., see U.S. Pat. Nos. 3,231,597; 3,291,660; and 7,282,573; and International Patent Application Publication WO 2004/056737, the disclosures of each of which are incorporated by reference). For example, metal acetylacetonates can be formed by the reaction of excess acetylacetone or a solution of a solid salt of it in an inert solvent followed by refluxing with the metal oxide, hydroxide, carbonate or basic carbonate of the metal. Metal acetylacetonates also can be prepared in nonaqueous solution by the reaction of metal salt and acetylacetone if the metal salts are soluble in the nonaqueous solvent. Metal acetylacetonates also can be formed by the reaction of acetylacetone with a metal oxide, hydroxide, carbonate or basic carbonate in aqueous solution, with or with pH control or added heat. Metal acetylacetonates also can be prepared in an anhydrous inert medium containing the ligand and metal, particularly alkali metals and alkaline earth metals. Any of these synthesis techniques can be used to prepare the metal chelates of the flux enhancing combinations provided herein.

In some embodiments, preferred species of the metal chelate additive containing a bidentate ligand and a metal or metal ion include $Al(acac)_3$, $Al(F_6acac)_3$, $Be(acac)^2$, $Be(F_6acac)^2$, $Ca(acac)_2$, $Ca(F_6acac)_2$, $Cd(acac)_2$, $Cd(F_6acac)_2$, $Ce(acac)_3$, $Ce(F_6acac)_3$, $Cr(acac)_3$, $Co(acac)_3$, $Cu(acac)_2$, $Cu(F_6acac)_2$, $Dy(acac)_3$, $Er(acac)_3$, $Fe(acac)_2$, $Fe(acac)_3$, $Ga(acac)_3$, $Hf(acac)_4$, $In(acac)_3$, $K(acac)$, $Li(acac)$, $Mg(acac)_2$, $Mg(F_6acac)_2$, $Mn(acac)_2$, $Mn(acac)_3$, $MoO_2(acac)_2$, $MoO_2(F_6acac)_2$, $Na(acac)$, $Nd(acac)_3$, $Nd(F_6acac)_3$, $Ni(acac)_2$, $Ni(F_6acac)_2$, $Pd(acac)_2$, $Pr(acac)_3$, $Pr(F_6acac)_3$, $Ru(acac)_3$, $Ru(F_6acac)_3$, $Sc(acac)_2$, $Sc(F_6acac)_2$, $Sm(acac)_3$, $Sn(acac)_2$, $Sn(acac)_2Cl_2$, t-butyl-Sn(acac)$_2$, t-butyl-Sn(acac)$_2Cl_2$, $Sn(F_6acac)_2$, $Sr(acac)_2$, $Sr(F_6acac)_2$, $Tb(acac)_3$, $V(acac)_3$, $Y(acac)_3$, $Y(F_6acac)_3$, $Zn(acac)_2$, $Zn(F_6acac)_2$, and $Zr(acac)_4$, where $F_6acac$ refers to 1,1,1,5,5,5-hexafluoropentane-2,4-dionate or 1,1,1,5,5,5-hexafluoroacetylacetonate.

The amount of metal chelate additive containing a bidentate ligand and a metal atom or metal ion can be selected to yield a concentration in the aqueous phase or organic phase of from about 0.001 1wt % to about 1 wt %, based on the weight of the aqueous phase or organic phase. In some embodiments, the amount of metal chelate additive containing a bidentate ligand and a metal atom or metal ion can be selected to yield a concentration in the aqueous phase or organic phase of about 0.001 wt %, 0.005 wt %, 0.01 wt %, 0.0125 wt %, 0.015 wt %, 0.0175 wt %, 0.02 wt %, 0.023 wt %, 0.025 wt %, 0.0275 wt %, 0.03 wt %, 0.0325 wt %, 0.035 wt %, 0.0375 wt %, 0.04 wt % , 0.0425 wt %, 0.045 wt %, 0.0475 wt %, 0.05 wt %, 0.0525 wt %, 0.055 wt %, 0.0575 wt %, 0.06 wt %, 0.0625 wt %, 0.065 wt %, 0.0675 wt %, 0.07 wt %, 0.0725 wt %, 0.075 wt %, 0.0775 wt %, 0.08 wt %, 0.0825 wt %, 0.085 wt %, 0.0875 wt %, 0.09 wt %, 0.0925 wt %, 0.095 wt %, 0.0975 wt %, 0.1 wt %, 0.2 wt %, 0.1 wt %, 0.4 wt %, 0.5 wt %, 0.6 wt %, 0.7 wt %, 0.8 wt %, 0.9 wt % or 1 wt %, based on the weight of the aqueous phase or organic phase, or that results in a concentration in the aqueous phase or organic phase in a range of at or about a to at or about b, where a is any one of the preceding wt % values of metal chelate additive, and b is any one of the preceding wt % values of metal chelate additive that is >a, such as from about 0.005 wt % to about 0.0625 wt %, or from about 0.02 wt % to about 0.575 wt %, or from about 0.01 wt % to about 0.07 wt %. or from about 0.04 wt % to about 0.4 wt %, etc. In some embodiments, at least 0.01 wt % metal chelate additive containing a bidentate ligand and a metal atom or metal ion is present in the aqueous phase or organic phase. In some embodiments, at least 0.02 wt % metal chelate additive containing a bidentate ligand and a metal atom or metal ion is present in the aqueous phase or organic phase.

In some embodiments, the methods provided herein include adding a combination of a boron rejection-enhancing additive and metal chelate additive containing a bidentate ligand and a metal atom or metal ion to the aqueous phase or organic phase or both, resulting in a ratio of boron rejection-enhancing additive to metal chelate additive in the aqueous phase or organic phase or both of from about 50:1 to about 0.5:1. In some embodiments, the ratio of boron rejection-enhancing additive to metal chelate additive in the aqueous phase or organic phase or both is about 50:1, or 40:1, or 30:1, or 25:1, or 20:1, or 15:1, or 10:1, or 9:1, or 8:1, or 7:1, or 6:1, or 5:1, or 4:1. or 3:1, or 2:1, or 1:1, or 0.5:1.

The metal chelate additive containing a bidentate ligand and a metal atom or metal ion can be added to the aqueous phase. The metal chelate additive containing a bidentate ligand and a metal atom or metal ion can be added to the organic phase. The metal chelate additive can be added in combination with the boron rejection-enhancing additive or sequentially in any order.

C. OTHER ADDITIVES

In the processes provided herein, the aqueous phase or organic phase or both of the interfacial polymerization reaction can include other additives in addition to the flux-enhancing additives and boron rejection-enhancing additives described herein. For example, the aqueous phase or organic phase or both can include nanoparticles, including insoluble carriers, and processing aids, such as surfactants, drying agents, catalysts, co-solvents, such as polar aprotic solvents, or any combination thereof.

1. Nanoparticles

In some embodiments, nanoparticles or carriers, for example, carriers that are relatively insoluble, can be included in the TFC membrane. The nanoparticles or relatively insoluble carriers or both can be processed using shear, cavitation, or impact forces prior to addition to the aqueous phase or organic phase or both. The nanoparticles or carriers also can be calcined for at least 1 hour at 200° C. or more prior to use. Carriers also can be processed by subjecting them to ultrasonic energy prior to use.

The nanoparticles or carriers can be processed to adjust the pH prior to use. For example, the nanoparticles or carriers or both can be processed in a solution at a pH lower than about 6 for at least 30 seconds or at a pH lower than about 5 for at least 30 seconds. The nanoparticles or carriers can be processed in a solution at a pH geater than about 8 for at least 30 seconds or in a solution at a pH greater than about 9 for at least 30 seconds. The nanoparticles or carriers or both also can be processed with heat in a solution for at least 5 minutes at a temperature of 40° C. or more.

Nanoparticles or carriers can be included in the support layer, the organic phase or layer, the aqueous phase, both the aqueous phase and the organic phase, or in the support layer, the aqueous phase and the organic phase. Nanoparticles or carriers also can be present in the water-wetted surface of the support membrane prior to interfacial polymerization between the monomers in the aqueous phase and the monomers in the organic phase. Nanoparticles, such as zeolites, particularly LTA (Linde Type A), can be added to the support membrane to improve functionality, for example, by making the membrane more resistant to compaction.

Nanoparticles or carriers can include a metal particle, such as gold, silver, copper, zinc, titanium, iron, aluminum, zirconium, indium, tin, magnesium, or calcium or an alloy thereof an oxide thereof or a combination thereof.They can also be a nonmetallic species such as $Si_3N_4$, SiC, BN, $B_4C$, or TiC or an alloy thereof or a combination thereof. They can be a carbon-based species such as graphite, carbon glass, a carbon cluster of at least $C_2$, a carbon nanotube, a carbon nanoparticle, a buckininsterfullerene, a higher fallerene, or a combination thereof.

Suitable zeolites for use as nanoparticles include LTA (Linde Type A), LTL (Linde Type L), OFF (offretite), RHO, PAU, and KFI. Such zeolites have different Si/Al ratios, and exhibit different characteristic charge and hydrophilicity and can therefore be selected to be included in RO membranes in different circumstances. Nanoparticles also can include zeolite precursors or amorphous aluminosilicates.

Zeolites can be crystalline aluminosilicates with fully cross-linked, open framework structures made up of corner-sharing $SiO_4$ and $AlO_4$ tetrahedra, A representative empirical formula of a zeolite is $M_{2/n}O \cdot Al_2O_3 xSiO_2 yH_2O$ where M represents the exchangeable cation of valence n. M is generally a Group 1 or 2 ion, although other metal, non-metal, and organic cations can balance the negative charge created by the presence of Al in the structure. The framework can contain interconnected cages and channels of discrete size, which can be occupied by water. In addition to $Si^{4}+$ and $Al^{3}+$, other elements also can be present in the zeolitic framework. They need not be isoelectronic with $Si^{4}+$ or $Al^{3}+$, but are able to occupy framework sites. Aluminosilicate zeolites typically display a net negative framework charge, but other molecular sieve frameworks can be electrically neutral.

Aluminosilicate zeolites with an Si:Al ratio less than 1.5:1 are preferred. Other preferred minerals include aluminite, alunite, ammonia alum, anauxite, apjohnite, basaluminite, batavite, bauxite, beidellite, boehmite, cadwaladerite, cardenite, chalcoalumite, chiolite, chloraluminite, cryolite, dawsonite, diaspore, dickite, gearksutite, gibbsite, halloysite, hydrobasaluminite, hydrocalumite, hydrotalcite, illite, kabnite, kaolin ite, mellite, moutmorillonite, fratroalunite, nontronite, pachnolite prehnite, prosopite, ralstonite, ransomi.te, saponite, thontsenolite, weberite, woodhouseite, and zincaluminite and combinations thereof.

Zeolites and other inorganic mineral compounds also can be selected based on the degree of crystallization. Amorphous portions of the nanoparticle are typically more soluble than crystalline portions of the nanoparticle and processing can increase solubility. The amount of crystalline material can be determined through several techniques including x-ray crystallography. The nanoparticles can have a structure with greater than 0.5%, 1% or 5% amorphous material by mass within the particle and may have a surface containing at least 40% of aluminum atoms or oxygen atoms directly bound to aluminum atoms.

Minerals that have cage-like framework structures similar to zeolites or have similar properties include the phosphates: kehoeite, pahasapaite and tiptopite; and the silicates: hsianghualite, lovdarite, viseite, partheite, prehnite, mggianite, apophyllite, gyrolite, maricopaite, okenite, tacharanite and tobermorite. Accordingly, minerals similar to zeolites also can be molecular sieves based on $AlPO_4$. These aluminophosphates, silicoaluminophosphates metalloaluminophosphates and metallosilicoaluminophosphates are denoted as $AlPO_{4-n}$, $SAPO_{-n}$, $MeAPO_{-n}$ and MeAPSO, respectively, where n is an integer indicating the structure type. $AlPO_4$ molecular sieves can have the structure of known zeolites or other structures. When Si is incorporated in an $AlPO_{4-n}$ framework, the product can be known as SAPO. MeAPO or MeAPSO sieves can be formed by the incorporation of a metal atom (Me) into an $AlPO_{4-n}$ or SAPO framework. Exemplary metal atoms include Li, Be, Mg, Co, Fe, Mn, Zn, B, Ga, Fe, Ge, Ti, and As.

Most substituted $AlPO_{4-n}$'s have the same structure as $AlPO_{4-n}$, but several new structures are only found in SAPO, MeAPO and MeAPSO materials. Their frameworks typically carry an electric charge.

Non-zeolite nanoparticles and or other relatively insoluble carriers can be selected from a list of inorganic mineral compounds that have a solubility product such that preferred concentrations of dissolved molecular additives can be achieved. For many compounds, these solubility products ($K_{sp}$) are well known. For compounds where these are not known experimentally, molecular additive releasing or other relatively insoluble carriers also can be selected by their counter ion. In such cases, compounds can be selected based on the presence of sulfate, hydroxide or oxide counterions. Solubility of these non-zeolite nanoparticles or other relatively insoluble carriers can be enhanced using processing, Particle size is often described in terms of average hydrodynamic diameter, assuming a spherical shape of the nanoparticles or carriers. The nanoparticle carrier can have an average hydrodynamic diameter of from about 0.1 nm to about 1000 nm, from about 10 nm to about 1000 nm, from about 20 nm to about 1000 nm, from about 50 nm to about 1000 nm, from about 0.1 nm to about 500 nm, from about 10 nm to about 500 nm, from about 50 nm to about 250 nm, from about 200 nm to about 300 nm, or from about 50 nm to about 500 nm.

The nanoparticles or carriers can be dispersed in a solution compatible with the solvent that will be used during interfacial polymerization. In some applications, water can be used as both the dispersion solvent for the nanoparticles or carriers and as the aqueous solvent for use during the interfacial polymerization. This dispersion lamely includes isolated and individual nanoparticles or carriers. Suitable methods for dispersion include stirring, ultrasonication, shaking, use of surfactants or co-solvents, use of a Microfluidizer™ high shear fluid processor (Microfluidics Corp., Westwood Mass.), use of a homogenizer, use of a mortar and pestle, use of a ball mill, or use of a jar mill. In some applications, some of the nanoparticles or carriers may still be associated with other nanoparticles or carrier particles as aggregates. These aggregates can be left in solution, or can be removed by a suitable technique, such as filtration.

When present, the amount of nanoparticles in the aqueous phase or organic phase is from about 0.001 wt % to about 0.5 wt % based on the weight of the aqueous phase or organic phase. In some embodiments, the aqueous phase or organic phase contains an amount of nanoparticles from about 0.005 wt % to about 0.1 wt % based on the weight of the aqueous phase or organic phase.

2. Processing Aids

In some embodiments, the aqueous phase or organic phase or both can include processing aids, such as surfactants, co-solvents, drying agents, catalysts, or any combination thereof. When present, a processing aid can be present in the aqueous phase or organic phase or both in an amount from about 0.001 wt % to about 10 wt % based on the weight of the aqueous phase or organic phase.

a. Surfactants

In some embodiments, the aqueous phase of the interfacial polymerization reaction can include a surfactant or a combination of surfactants. The surfactant can, for example, help the aqueous phase wet the support layer or can help in the dispersion of materials, e.g., nanoparticles, in the aqueous phase. The surfactant(s) can be selected from among nonionic, cationic, anionic, and zwitterionic surfactants depending on the chemistry of the other additives. For example, a cationic surfactant would not be selected when anionic additives are being used. Exemplary surfactants include sodium lauryl sulfate (SLS), alkyl ether sulfates, alkyl sulfates, olefin sulfonates alkyl ether carboxylates, sulfosuccinates, aromatic sulfonates, octylphenol ethoxylates, ethoxylated nonylphenols, alkyl poly(ethylene oxide), such as polyoxyethylene oleyl ethers e.g., polyoxyethylene (20) oleyl ether (Brij®98), copolymers of poly(ethylene oxide) and poly(propylene oxide) (commercially called poloxamers or poloxamines), alkyl polyglucosides, octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyltrimethyl ammonium bromide or chloride, hexadecyltrimethyl ammonium bromide or chloride, and alkyl betaines. Preferred among these are alkyl poly(ethylene oxides), such as polyoxyethylene oleyl ethers, SLS, octylphenol ethoxylates, and ethoxylated nonylphenols.

When present, the amount of surfactant in the aqueous phase is from about 0.005 wt % to about 0.5 wt % based on the weight of the aqueous phase. In some embodiments, the aqueous phase contains no surfactant. In some embodiments, the aqueous phase contains an amount of surfactant from about 0.01 wt % to about 0.25 wt % based on the weight of the aqueous phase.

b. Drying Agents

In some embodiments, one or more drying agents can be included in the aqueous phase of the interfacial polymerization reaction mixture to form the TFC membrane. Drying agents can include, for example, hydrophobic organic compounds, such as a hydrocarbon or an ether, glycerin, citric acid, glycols, glucose, sucrose, triethylammonium camphorsulfonate, triethylammonium benzenesulfonate, triethylammonium toluenesulfonate, triethylammonium methane sulfonate ammonium camphor sulfonate, and ammonium benzene sulfonate, and those described in U.S. Pat. Nos. 4,855,048; 4,948,507; 4,983,291; and 5,658,460.

When present, the amount of drying agent in the aqueous phase is from about 2 wt % to about 10 wt % based on the weight of the aqueous phase. In some embodiments, the aqueous phase contains an amount of drying agent from about 3 wt % to about 5 wt % based on the weight of the aqueous phase.

In some embodiments, the aqueous phase of the interfacial polymerization reaction can include triethylammonium camphorsulfonate (TEACSA) as the drying agent. When present, the TEACSA is present in an amount from about 2 wt % to about 10 wt % based on the weight of the aqueous phase. In some embodiments, the TEACSA is present in the aqueous phase in an amount from about 3 wt % to about 5 wt % based on the weight of the aqueous phase. In some embodiments, the amount of TEACSA in the aqueous phase is about 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt % based on the weight of the aqueous phase, or an amount in a range of at or about c to at or about d where c is any one of the preceding wt % values of TEACSA, and d is any one of the preceding wt % values of TEACSA that is >c, such as from about 2 wt % to about 10 wt %, or from about 3 wt % to about 7.75 wt %, or from about 4 wt % to about 6 wt %, etc. In some embodiments, the TEACSA is present in the aqueous phase in an amount of about 4.5 wt %.

c. Catalysts

Catalysts can be included in the aqueous phase or organic phase or both. In some embodiments, the catalyst can include diethylamim, triethylamine, ethylene diamine, triethanolamine, diethanolamine, ethanolamine, dimethylaminopridine, or combinations thereof. In some embodiments, the catalyst can be an acid catalyst or a base catalyst. An acid catalyst can be an inorganic acid, an organic acid, a Lewis acid, or a quaternary ammonium salt or an acid salt of ammonia or a primary, secondary or tertiary amine. Exemplary acid catalysts include hydrochloric acid, nitric acid, sulfuric acid, an aliphatic sulfonic acid, an aromatic sulfonic acid a carboxylic acid, a fluorinated carboxylic acid, such as trifluoroacetic acid, a cycloaliphatic sulfonic acid, boric acid, tetrafluoroboric acid, aluminum trihalide, an aluminum trialkoxide, a boron trihalide, such as a boron trifluoride, a tin tetrahalide, such as tin tetrachloride, and zinc tetrafluoroborate.

Exemplary base catalysts include alkoxide salts, such as sodium ethoxide; hydroxide salts, such as sodium hydroxide and potassium hydroxide; carbonate salts, such as potassium carbonate; phosphate salts, such as trisodium phosphate; phenoxide salts, such as sodium phenoxide; borate salts, such as sodium borate; carboxylate salts, such as potassium acetate; ammonia; and primary, secondary and tertiary amines.

When present, the amount of catalyst in the aqueous phase or organic phase or both is from about 0.001 wt % to about 0.5 wt % based on the weight of the aqueous phase or organic phase. In some embodiments, the aqueous phase or organic phase or both contains an amount of catalyst from about 0.005 wt % to about 0.25 wt % based on the weight of the aqueous phase or organic phase.

d. Co-Solvents

The aqueous phase or organic phase or both can include a co-solvent. The co-solvent can be a polar aprotic solvent or a non-polar solvent or combination thereof. Exemplary polar aprotic solvents include dimethylformamide, dimethylacetamide, tetrahydrofuran, dimethyl sulfoxide, 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof.

D. PREPARATION OF TFC MEMBRANES

Thin film composite (TFC) membranes can be used in nanofiltration reverse osmosis (RO) and forward osmosis (FO) applications. For RO applications, the membranes include a support layer, which is preferably porous. The support layer can be hydrophilic or hydrophobic. In some applications, the support layer is hydrophilic. The TFC membrane also includes at least one discrimination layer on a surface of the support layer. The TFC membrane can include an anti-fouling layer deposited on either or both surfaces of the TFC membrane. The TFC membrane also can include a protective layer deposited on either or both surfaces of the TFC membrane or on an anti-fouling layer. For example, a solution of a hydrophilic polymer, such as polyvinyl alcohol in water, or a solution of sodium citrate in water, or both, can be applied to the surface of the discrimination layer followed by application of heat to provide a heat cure of the hydrophilic polymer layer.

1. Support Layer

The support layer typically includes a polymeric microporous support membrane, which in turn is often supported by a non-woven or woven mesh fabric to improve handling properties of the membranes or for mechanical strength or both. The support layer can include a polysulfone or other suitably porous membrane, such as a membrane containing polyethersulfone, poly(ether sulfone ketone), poly(ether ethyl ketone), poly(phthalazinone ether sulfone ketone), polyacrylonitrile, polyvinyl chloride, polyester, polystyrene, polysulfone, polypropylene, cellulose nitrate, cellulose acetate, cellulose diacetate, or cellulose triacetate. The support layer typically is about 25 to 250 microns in thickness. The support layer is porous, and often the smallest pores of the support layer are located very near the upper surface. Porosity at the surface can be low, for instance from 5-15%, of the total surface area.

The preparation of the support layer can include spraying or casting a polymer solution onto a woven or non-woven fabric layer. Exemplary processes blown in the art to form the support layer are disclosed, e.g., in U.S. Pat. Nos. 3,926,798; 4,039,440; 4,337,154; and 8,177,978; and in U.S. Pat. Pub. Nos. 2011/0174728 and 2014/0014575, the disclosure of each of which is incorporated herein by reference. One or more than one reinforcing fabric layers of a woven or nonwoven material or a combination thereof, made up of polymeric fibers, can be included in the TFC membrane. When present, the fabric layer preferably is permeable to water, is flat, and is without stray fibers that could penetrate the support layer or the discrimination layer. The fabric layer generally is thin to decrease cost and to maximize membrane area, is resistant to extensional forces, and is mechanically resistant to deformation at high pressures.

The preparation of the support layer generally includes the addition of N-methylpyrrolidone (NMP) solvent (Acros Organics, Waltham, Mass.) to a polysulfone polymer ($M_n$-26,000 ($M_n$ being the number average molecular weight) from Aldrich, St. Louis, Mo.) in transparent bead form in airtight glass bottles. Alternatively, dimethylformamide (DMF) can be used as the solvent. The mixture then is agitated for several hours until complete dissolution of the polysulfone polymer is achieved, forming a dope or casting solution. The casting solution can be cast or spread over a woven or non-woven mesh fabric layer, which optionally can be attached to a glass plate via a knife-edge. In some embodiments, the glass plate with the mesh fabric layer and casting solution can immediately be immersed into demineralized water that has been maintained at the desired temperature (such as from about 4° C. to about 30° C.). Immediately phase inversion begins, and after several minutes the woven or non-woven fabric layer supporting the polysulfone membrane can be separated from the glass plate to form the support layer. The support layer then can be washed thoroughly with deionized water and stored in cold conditions until used. In a continuous coating process for production of a support layer (e.g., using equipment and/or a process similar to those described in U.S. Pat. Nos. 4,214,994; 4,277,344; 6,153,133; 7,490,725; and 8,580,341; U.S. Pat. Pub. Nos. 2009/0050558A1 and 2012/0292249A1; and Int. Pat. App. Pub. No. WO 2014/080496 A1, which describe coating processes for continuous preparation of reverse osmosis membranes), a glass plate would not be required. The porous support layer typically is kept wet until use.

The casting solution of the support layer can include additives. For example, the casting solution can include nanoparticles, such as zeolites or carbon nanotubes or spherical fullerenes or a combination thereof, an alkylene glycol, a polyalkylene glycol, N-methyl-2-pyrrolidinone, dimethylacetamide, or any combination of these additives. Exemplary alkylene glycols include ethylene glycol, diethylene glycol triethylene glycol, propylene glycol, dipropylene glycol, and tripropylene glycol and combinations thereof. Exemplary polyalkylene glycols include a polyethylene glycol (PEG) and a polypropylene glycol. Polyethylene glycols (PEGs) having molecular weights of 400 to 20,000, preferably 600 to 2,000, can be included in the casting solution.

2. Discrimination Layer

At least one discrimination layer comprising a polyamide and the flux-enhancing and boron rejection-enhancing additives described herein is formed on a surface of the support layer, thereby forming a thin film composite membrane. The discrimination layer is synthesized using an interfacial polymerization process on the porous support membrane. In the synthesis of the discrimination layer, two immiscible solvents are used, usually an aqueous phase solution and an organic phase solution, so that a monomer in one solution reacts with a monomer in the other solution to polymerize and form the discrimination layer. The polymerization reactions are very fast and relatively high molecular weight polymers are obtained.

The discrimination layer is a permeable membrane that can contain any material as long as the discrimination layer allows filtration of a fluid for which filtration is desired. In an exemplary embodiment, the discrimination layer can be a polyamide layer. Although the chemistry of the discrimination layer is not to be viewed as limited, in an exemplary embodiment, the polyamide layer can be formed by interfacial polymerization of a polar solution and a non-polar solution. An exemplary polar solution can be an aqueous phase containing a polyamine such as m-phenylenediamine (MPD). An exemplary non-polar solution can be an organic phase containing a polyfunctional acid halide such as trimesoyl chloride (TMC). The flux-enhancing and boron rejection-enhancing additives described herein can be added to either the polar or non-polar solution or to both solutions to form a discrimination layer where the boron rejection-enhancing additive, such as the boron rejection-enhancing additives described herein, is fixed or incorporated, e.g., covalently crosslinked, in the structure of the membrane.

Discrimination layers prepared by methods and chemistries known in the art, for example, the chemistry and methods of manufacturing discrimination layers that are disclosed in any of U.S. Pat. Nos. 4,277,344; 4,902,424; 5,108,607; 5,543,046; 6,337,018; and 7,109,140, all of which are herein incorporated by reference, often do not exhibit high boron rejection after formation on a surface of a support layer to produce a thin film composite membrane. As shown herein, the methods and chemistries known in the art can be modified to include the boron rejection-enhancing additives described herein during formation of the discrimination layer, such as by adding the boron rejection-enhancing additives to either the polar or non-polar solution or both solutions, producing thin film composite membranes that exhibit high boron rejection, thereby overcoming the deficiencies of known membranes.

In some embodiments, the discrimination layer can contain a polyamide formed by the interfacial polymerization between one or more di- or polyfunctional amines and one or more di- or polyfunctional acyl chlorides. The di- or polyfunctional amines can be aromatic and/or aliphatic. The di- or polyfunctional acyl chlorides can be aromatic and/or aliphatic.

The polymer matrix that forms the discrimination layer can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers also can be chosen so as to be capable of undergoing an interfacial polymerization reaction to form a polymer matrix (i.e., a three-dimensional polymer network) when brought into contact. The first and second monomers also can be selected so as to be capable of undergoing a polymerization reaction when brought into contact to form a polymer product that is capable of subsequent crosslinking by exposure to, for example, heat, light radiation, or a chemical crosslinking agent.

The first monomer can be selected so as to be soluble in a polar liquid, preferably water, to form a polar mixture. The difunctional or polyfunctional nucleophilic monomer can have primary or secondary amino groups and can be aromatic (e.g., a diaminobenzene a triaminobenzene, m-phenylenediamine, p-phenylenediamine, 1,3,5-triaminobenzene, 1,1,4-triaminobenzene, 3,5-diaminobenzoic acid, 2,4-diaminotoluene, 2,4-diaminoanisole, and xylylenediamine) or aliphatic (e.g., ethylenediamine propylenediamine, piperazine, and tris(2-diamino-ethyl)amine). In a further example, the polar liquid and the first monomer can be the same compound; that is, the first monomer can be provided and not dissolved in a separate polar liquid.

Examples of suitable amine species include primary aromatic amines having two or three amino groups, e.g., m-phenylenediamine, and secondary aliphatic amines having two amino groups, for example piperazine. In some embodiments, two or more different species of amine monomer can be included in the polar liquid (e.g., water) to form the polar phase. The amine can be applied to the microporous support as a solution in a polar liquid, e.g., water. The resulting polar mixture typically includes from about 0.1 wt % to about 20 wt % amine, preferably from about 0.5 wt % to about 6 wt %, amine, such as 0.5 wt %, 1 wt %, 2 wt %, 3 wt %, 4 wt %, 5 wt %, or 6 wt % amine. Once coated on a porous support layer, excess polar mixture optionally can be removed. The polar mixture need not be aqueous but the polar liquid should be immiscible with the apolar liquid. Although water is a preferred solvent, non-aqueous polar solvents can be used, such as acetonitrile lower monohydric alcohols, and ketones. Combinations of water and one or more polar solvents can be used.

In some embodiments, a second monomer can be selected so as to be miscible with the polar liquid forming a polar mixture (i.e., aqueous phase). The second monomer optionally also can be selected so as to be immiscible with a non-polar liquid. The second monomer can be a dinucleophilic or a polynucleophilic monomer. The nucleophilic monomer can contain two or more, for example, three, nucleophilic groups per molecule.

The polar mixture can be applied to the porous support layer by dipping, immersing, coating, spraying, or any other application technique. Once coated on the porous support layer, excess polar mixture optionally can be removed by evaporation, drainage, air knife, rubber wiper blade, nip roller, sponge, or other device or process:

In some embodiments of the processes provided herein, an aqueous phase containing a flux-enhancing additive and a boron rejection-enhancing additive, such as the flux-enhancing and boron rejection-enhancing additives described herein, is applied on a surface of a support layer, and an organic phase layer then is applied, the components of which interact with components of the aqueous phase, and at the interface between these layers polymerization occurs, resulting in formation of a discrimination layer. In other embodiments of the processes provided herein, an aqueous phase is applied on a surface of a support layer, and an organic phase containing a flux-enhancing additive and a boron rejection-enhancing additive, such as the flux-enhancing and boron rejection-enhancing additives described herein, then is applied, the components of which interact with components of the aqueous phase, and at the interface between these layers polymerization occurs, resulting in formation of a discrimination layer.

The method of forming the discrimination layer on a surface of the porous support layer can include floating the porous support layer on the surface of the aqueous phase; or casting the aqueous phase on a surface of the porous support layer; or spraying the aqueous phase onto a surface of the porous support layer; or immersing the porous support layer in the aqueous phase. In methods that include floating or immersing the porous support in the aqueous phase, the treating time can be varied very widely in a range of from about 1 second to about 24 hours or longer, but such treating time is not critical. Effecting the treatment once usually is sufficient, but the treatment can be performed twice or more.

Representative conditions for reaction of an amine (e.g., MPD) with an electrophile (e.g., TMC) to form a polyamide thin film composite membrane include using a ratio of concentration of MPD to concentration of TMC in the range of from about 10:1 to about 25:1, with the MPD concentration being from about 1 wt % to about 6 wt % of the polar phase (i.e., aqueous phase). In some embodiments, the ratio of concentration of MPD to concentration of TMC is about 10:1, or about 11:1, or about 12:1, or about 13:1, or about 14:1, or about 15:1, or about 16:1, or about 17:1, or about 18:1, or about 19:1, or about 20:1, or about 21:1, or about 22:1, or about 23:1, or about 24:1, or about 25:1. The polymerization reaction can be carried out at room temperature in an open environment, or the temperature of either the polar liquid or non-polar liquid, or both, can be modulated or controlled, e.g., at a temperature above room temperature (20° C. to 25° C.) or a temperature below room temperature. Once formed, the discrimination layer can act as a barrier to inhibit contact between the reactants and to slow the reaction. The discrimination layer typically is very thin and permeable to water, but relatively impermeable to dissolved, dispersed, or suspended solids, such as salts to be removed from saltwater or brackish water in use to produce purified water.

In some embodiments, the amount of boron rejection-enhancing additive, e.g., biguanide compound, dicarbonate compound, pentathiodicarbonate compound, or salts thereof, used in the aqueous phase can be selected to yield a ratio of the concentration of MPD to the concentration of boron rejection-enhancing additive in the range of from about 10:1 to about 100:1, with the MPD concentration being from about 1 wt % to about 6 wt % of the polar phase (aqueous phase). In some embodiments, the range of the ratio of concentration of MPD to the concentration of boron rejection-enhancing additive is about 10:1, or about 20:1, or about 30:1, or about 40:1, or about 50:1, or about 60:1, or about 70:1, or about 80:1, or about 90:1, or about 100:1.

The amount of boron rejection-enhancing additive, e.g., biguanide compound, dicarbonate compound, pentathiodicarbonate compound, or salts thereof, can be selected to yield a concentration in the aqueous phase or organic phase of from about 0.01 wt % to about 5 wt %, based on the weight of the aqueous phase or organic phase. In some embodiments, the amount of biguanide compound, dicarbonate compound, pentathiodicarbonate compound, or salts thereof, e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt, can be selected to yield a concentration in the aqueous phase or organic phase of from about 0.01 wt.% to about 0.1 wt %, or from about 0.05 wt % to about 1.5 wt %, based on the weight of the aqueous phase or organic phase.

Metal chelate additive, nanoparticles or carriers or processing aids, such as surfactants, drying agents, catalysts, and co-solvents, or any combination thereof also can be present in the aqueous phase or organic phase to modify surface properties or further increase performance, for example, to improve fouling resistance. In some embodiments, the processes provided herein include in the aqueous phase MPD, TEASCA, polyoxyethylene(20) oleyl ether, SLS or other surfactant, and the boron rejection-enhancing additive that includes a biguanide compound, dicarbonate compound, pentathiodicarbonate compound, or salts thereof, for example, a polyalkylene biguanide, polyalkylene dicarbonate, or polyalkylene pentathiodicarbonate compounds or salts thereof, e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt.

In an exemplary embodiment, the aqueous phase is formed by adding one or more additives to the polar solvent, e.g., water. Typically, the polar solvent, e.g., water, is present in the aqueous phase first and all other additives are added to the solvent, although any permutation of order of addition of the components can be used.

In some embodiments, a second monomer can be selected so as to be miscible with the non-polar liquid forming a non-polar mixture (i.e., organic phase), although for monomers having sufficient vapor pressure, the monomer optionally can be delivered from a vapor phase. The second monomer optionally also can be selected so as to be immiscible with a polar liquid. Typically, the second monomer can be a dielectrophilic or a polyelectrophilic monomer. The electrophilic monomer can be aromatic in nature and can contain two or more, for example three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability.

Suitable acyl halides include polyfunctional acyl halides, including trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide can be dissolved in the non-polar liquid (i.e., organic solvent) in a range of, for example, from about 0.01 wt % to about 10.0 wt %, or from about 0,03 wt % to about 3 wt % or from about 0,05 wt % to about 5 wt %. Suitable non-polar liquids are capable of dissolving the electrophilic monomers (e.g., polyfunctional acyl halides) and are immiscible with a polar liquid (e.g., water). Generally the non-polar liquid (i.e., organic solvent) is a water-immiscible solvent that is inactive in the interfacial polymerization, does not form a chemical bond with the halide compound, and does not damage the porous support layer. Exemplary non-polar liquids (i.e., organic solvents) that can be used to dissolve the acyl halide include aliphatic hydrocarbons, such as $C_8$-$C_{24}$ hydrocarbons and mixtures thereof, such as isoparaffinic solvents such as Isopar™ isoparafinnic fluids (e.g., Isopar™ G petroleum naphtha, a low odor, low aromatic $C_{10}$-$C_{12}$ isoalkanes solvent, sold by ExxonMobil, Irving, Tex.) and Isane® isoparaffinic solvents (Total Special Fluids, Oudalle, France). The solvent used can be a single solvent or a mixture of solvents.

Additional non-polar liquids (i.e. organic solvents) can be included in the organic phase. For example, a non-polar liquid that does not pose a threat to the ozone layer and yet is sufficiently safe in terms of its flashpoint and flammability to undergo routine processing without having to undertake extreme precautions can be selected. These can include $C_5$-$C_7$ hydrocarbons and higher boiling point hydrocarbons and aromatics, i.e., those with boiling points greater than about 90° C., such as $C_8$-$C_{24}$ hydrocarbons and mixtures thereof, which have more suitable flashpoints than their $C_5$-$C_7$ counterparts, but are less volatile. Exemplary non-polar liquids that can be included in the organic phase include trimethyl benzenes, such as 1,2,3-trimethylbenzene 1,2,4-trimethylbenzene, and 1,3,5-trimethylbenzene (i.e., mesitylene); tetramethylbenzenes, such as 1,2,3,4-tetramethylbenzene, 1,2,4,5-tetramethylbenzene and 1,3,4,5-tetramethylbenzene, pentamethylbenzene, hexamethylbenzene, diisopropylbenzenes, triisopropylbenzenes, and tetraisopropylbenzene. In some embodiments, the organic phase includes a polyfunctional acyl halide and 1,3,5-trimethylbenzene.

The organic phase can include antioxidants. For example, antioxidants for processing and long-term thermal stabilization can be included in the organic phase. Antioxidants can protect the membrane against degradation, for example, from light exposure. Exemplary antioxidants include phenolic primary antioxidants, such as the phenolic primary antioxidant pentaerythritol tetrakis(3-(3,5-di-tert-butyl-4-hydroxyphenyl)propionate), sold as Irganox® 1010. The antioxidant can be dissolved in the organic phase in a range of, for example, from about 0.0025 wt % to 0.05 wt %, or from about 0.005 wt % to 0.025 wt %, or from about 0.01 wt % to about 0.025 wt %.

The non-polar mixture can be applied by dipping, immersing, coating, spraying, or any other application technique.

In some embodiments, the polyfunctional acyl halide monomer (also referred to as acid halide) is coated on the porous support layer, typically by application of the organic phase solution. The amine solution can be coated first on the porous support followed by the acyl halide solution. The monomers can react when in contact, thereby polymerizing to produce a polymer (e.g., polyamide) matrix discrimination layer at the upper surface of the support layer. Although one or both of the polyfunctional amine and acyl halide layers can be applied to the porous support layer from a solution, such as by application of the aqueous and organic phases discussed above, they alternatively can be applied by other means, such as by vapor deposition or heat.

In the processes provided herein, the boron rejection-enhancing additive, e.g., a biguanide compound, dicarbonate compound, pentathiodicarbonate compound, or salts thereof, can be added to the aqueous phase or the organic phase or both phases of the interfacial polymerization process before contact between the phases. By including the boron rejection-enhancing compound as an additive in the interfacial polymerization reaction, increased boron rejection through the membrane is observed, e.g., during reverse osmosis, without substantially affecting flux or salt rejection. In some examples, the flax and/or salt rejection are maintained. In other examples, the flux anchor salt rejection are improved.

The boron rejection-enhancing additives, e.g., a biguanide compound, dicarbonate compound, pentathiodicarbonate compound, or salts thereof, are thought to affect the polymerization reaction and ultimately membrane structure, leading to improved performance. Nanoparticles, such as zeolites or carbon nanotubes or spherical fullerenes or a combination thereof, also can be present, in either the aqueous phase or the organic phase or both, to modify surface properties or further increase performance, e.g., to improve fouling resistance.

It can be advantageous to store the support layer for a period of time, e.g., from 1 minute for up to one hour, before interfacial polymerization on the support layer between the aqueous and organic phase solutions. In some embodiments, the discrimination layer can be formed by applying the organic phase solution to the support layer and, after at least 10 seconds, preferably 2 minutes, and more preferably 5 minutes after the organic phase solution was applied, applying the aqueous phase solution to the organic phase solution on the support layer. In some embodiments the discrimination layer can be formed by applying the aqueous phase solution to the support layer, allowing it to dry, and then applying the organic phase solution to the dried aqueous phase on the support layer.

Prior to addition to the aqueous phase or organic phase or both, the flax-enhancing and boron rejection-enhancing additives can be subjected to sonic or ultrasonic energy, e.g., from an ultrasonic probe or ultrasonic bath, and/or the aqueous phase or organic phase or both can be subjected to sonic or ultrasonic energy just before or during interfacial polymerization. In some applications, an ultrasonic probe can be immersed into the aqueous phase or organic phase or both that contains the boron rejection-enhancing additive prior to or during interfacial polymerization or both. In some applications, the aqueous phase or organic phase or both is subjected to ultrasonic energy for a time from about 1 minute to about 60 minutes prior to interfacial polymerization.

Practice of the invention does not depend critically on the overall shape of the thin film composite membrane. Flat Sheet and hollow fiber configurations are two of the possibilities for this overall shape. For flat sheet membranes, a discrimination layer can be on the top surface, the bottom surface, or on both surfaces of the support layer. For hollow fiber membranes, a discrimination layer can be on the inner surface of the support layer, the outer surface of the support layer, or on both inner and outer surfaces of the support layer.

3. Protective Layer

The thin film composite membrane produced by the methods provided herein can be provided with a protective coating layer by coating the surface of the membrane with an aqueous phase of a water-soluble organic polymer in order to protect the membrane surface from damage during the handling of the membrane. Examples of such a water-soluble organic polymer include polymers such as polyethylenimine, polyvinyl alcohol, polyvinyl ether, polyvinylpyrrolidone polyacrylamide, or polyacrylic acid; copolymers consisting mainly of the monomers constituting these polymers; derivatives of these polymers or copolymers; and mixtures of these compounds. Among them, polyvinyl alcohol, polyethylenimine and polyvinylpyrrolidone are particularly preferred.

The surface of the thin film composite membranes produced by the methods provided herein can be coated with an aqueous solution of a sodium salt of citric acid in order to form a protective layer. Examples of such a sodium salt of citric acid include sodium monocitrate, sodium dicitrate, and sodium tricitrate.

The TFC membrane coated with such an aqueous phase of the water-soluble organic polymer generally is subjected to drying. The drying is effected by exposing the coated membrane to temperatures of from about 30° C. to about 100° C. for a time of about 1 minute to about 20 minutes. The time required for drying depends on the type of oven used and membrane placement within the oven.

4. Anti-Fouling Layer

Anti-fouling layers can be deposited on either or both surfaces of the thin film composite membrane. An RO membrane can be provided with an anti-fouling capacity by applying a layer capable of forming halamines on the feed stream contact surface of the RO membrane (see, e.g., U.S. Pat. No. 8,567,612). For example, an anti-fouling layer can be formed by depositing a nitrogen-containing polymer solution on the discrimination layer. The polymer can be crosslinked to insolubilize the anti-fouling layer. An intermediate layer can be positioned between the anti-fouling and the discrimination layers so that the thickness and permeability of the anti-fouling and intermediate layers is sufficient to cause halamine formation at the surface of the anti-fouling layer before the discrimination layer is degraded by the halogen. Sufficient nitrogen can be provided in the anti-fouling layer to protect the discrimination layer from fouling by the formation of halamines on the surface of the anti-fouling layer adjacent the feed stream, to permit recharging of the anti-fouling layer by the further addition of halogens thereto to form additional halamines and/or to prevent halogen damage to the discrimination layer by the halogen during operation after multiple recharging.

Other chemistries and techniques for providing an anti-fouling layer, such as treatment with polyethylene oxide to introduce PEG moieties, or using fluorinated polymers or polyacrylonitrile graft copolymers, are known in the art (see, e.g., U.S. Pat. Nos. 8,163,814; 8,505,743; 8,505,745; and 8,754,139, the disclosure of each of which is incorporated by reference herein).

E. CLEANING THE MEMBRANES

The TFC membranes provided herein that incorporate, e.g., covalently crosslink, one or more boron rejection-enhancing additives into the structure of the membrane can be cleaned in order to extend membrane life and to minimize loss of performance, e.g., decrease in flux and boron rejection and salt rejection characteristics. During the course of normal operation, TFC membranes can become fouled by suspended solids, microorganisms, and mineral scale that builds up and is deposited on the membranes, causing loss in water output, salt rejection, or both. The TFC membranes provided herein can be cleaned using an aggressive cleaning regimen. For example, the TFC membranes provided herein can be cleaned at a high pH, for example, a pH greater than 11, 12, 13, or higher, with a cleaner that removes organic fouling, such as a sodium hydroxide-based cleaner. The TFC membranes can be cleaned at a low pH, for example, a pH less than 4, 3, 2, 1, or lower, with a cleaner to remove scale, such as citric acid or hydrochloric acid. The TFC membranes provided herein can be cleaned with both high pH reagents, e.g., higher than pH 11, and low pH reagents, e.g., lower than pH 4. The membranes can be cleaned first with a high pH reagent, e.g., higher than pH 11, followed by cleaning with a low pH reagent, e.g., lower than pH 4, or cleaned first with a low pH reagent, e.g., lower than pH 4, followed by cleaning with a high pH reagent, e.g., higher than pH 11, or any other permutation of cleaning regimens or steps. The membranes provided herein can be subjected to such aggressive cleaning regimens with minimal membrane degradation and retention of flux and salt rejection and boron rejection characteristics.

F. MODULES

The membranes produced by the processes described herein can be spirally wound around a central porous permeate collection tube to produce a. semipermeable membrane module for use in a pressure vessel. A typical spirally-wound semipermeable membrane module includes a plurality of leaves that are individual envelopes of sheet-like semipermeable membrane material that sandwich there between a layer of porous permeate carrying material, such as a polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g., cross-extruded filaments of polypropylene, that provide flow passageways for the feed water being pumped from end to end through the pressure vessel. An appropriate lay-up of such alternating leaves and spacer sheets is then spirally wound about :a hollow tube having a porous sidewall to create a right circular cylindrical module. An exemplary spirally-wound separation module is shown in FIG. 1 and in U.S. Pat No. 4,842,736, the disclosure of which is incorporated herein by reference. The module contains a plurality of spiral feed passageways, through which passageways the feed liquid being treated flows in an axial direction. Internally within the membrane envelopes, the permeating liquid flows along a spiral path inward until it reaches the perforated central tube where it collects and through which it then flows axially to the outlet.

FIG. 1 illustrates an exemplary embodiment of a spiral-wound module. The module includes perforated central tube 1 that collects the filtered fluid. The material of perforated central tube 1 is not limited and can be any material that is resistant to corrosion to the fluid being filtered. In exemplary embodiments, perforated central tube 1 can be made of polyvinyl Chloride (PVC). Other materials that also can be used include metals, polymers, ceramics, or combinations thereof Additional exemplary materials that can be used to form the perforated central tube 1 include plastic materials such as acrylonitrile-butadiene-styrene, polysulfone, poly (phenylene oxide), polystyrene, polypropylene, polyethylene, or the like. The size and arrangement of the perforations can be arranged in any manner desirable as long as they allow for the filtered fluid to flow into the perforated central tube 1. Wound around perforated central tube 1 is a set of leaves composed of folded permeable membrane sheets 2, feed channel spacers 3, and permeate collection sheet 4. Around the outside of the module is a shell 5 and an anti-telescoping device 6, located at each end of the module.

Modules containing membranes produced using the processes described herein can be used to produce a stream of potable water from seawater at pressure conditions of not greater than about 800 psi and brackish water at pressure conditions of not greater than about 225 psi. The membranes and processes described herein also can be used to purify tap water.

G. MEMBRANE CHARACTERISTICS

In preferred embodiments, the boron rejection is at least 90%, such as at least 90.5%, 91%, 91.5%, 92%, 92.5%, 93%, 93.5%, 94%, 94.5%, 95%, 95.5%, 96%, or more, such as between or between about 91% and 96%, or 92% and 94%, or 92% and 93% boron rejection; the total dissolved solids (TDS) rejection, which is a measure of the combined content of all inorganic and organic substances in the water, is at least 99%, such as between or between about 99.1% and 99.9%, for example, between or between about 99.5% and 99.9%, such as at least 99.5%, 99.6%, 99.7%, 99.8%, 99.9%, or more; and the flux (aqueous solution of 32,000 ppm NaCl) is at least 9.10, 11, 12, 13. 14, 15, 16, 17, 18, 19, 20, or more, gallons/friday (gfd) at 800 psi such as between or between about 9 gfd and 20 gfd.

Boron rejection, TDS rejection, and flux can be determined initially, for example, after production of the TFC membrane, but before operation, and can be determined after operation of the TFC membrane for a period of time, such as, for example, 1 week, 2 weeks, 3 weeks, 4 weeks, or more. The TFC membranes. described herein that incorporate a boron rejection-enhancing additive in the structure of the membrane can exhibit high boron rejection values and high flux without experiencing a loss in salt rejection after operation of the TFC membrane for a period of time, such as 1 week, 2 weeks, 3 weeks, 4 weeks, or more, as compared to similar membranes prepared in the absence of the boron rejection-enhancing additive or membranes post-treated with a boron rejection-enhancing additive. The TFC membranes described herein that incorporate a boron rejection-enhancing additive in the structure of the membrane can exhibit high boron rejection values, high flax, and high salt rejection after cleaning the membrane, such as, for example, with the cleaning regimen and reagents described in Section F.

Water flux can be determined by measuring permeate flow using Equation 1:

$$\text{Flux}(gfd) = \frac{\text{permeate(gallons)}}{\text{membrane area}(ft^2) \cdot \text{time(day)}}.$$

Total solids rejection (R, in %) can be calculated using Equation 2:

$$R(\%) = \left(1 - \frac{Cp}{Cf}\right) \times 100$$

where $C_f$ the concentration of IDS in the feed water and $C_p$ is the concentration of TDS in the permeate, both of which can be measured using a calibrated conductivity meter.

Boron rejection can be determined using the following equation:

$$\text{rej}_B = 1 - P_B/F_B$$

where $P_a$ and $F_a$ are the boron content of the permeate and feed, respectively.

H. EXAMPLES

1. Preparation and Testing of Thin Film Composite Membranes Containing Varying Amounts of Boron Rejection-Enhancing Additive A series of five thin film composite (TFC) membranes were prepared by interfacial polymerization using varying amounts of the boron rejection-enhancing additive polyhexamethylene biguanide (PHMB) in the aqueous phase. A control membrane not containing any PHMB was also prepared. The membranes were tested for flux, salt rejection and boron rejection.

The membranes were prepared using the following general procedure. A polyester nonwoven reinforced polysulfone support was coated with an aqueous solution that contained a polyamine and either 100 ppm, 500 ppm, 1000 ppm, 2500 ppm, or 5000 ppm PHMB. After droplets from the surface were removed, the support was coated with an organic solution that contained a polyfunctional acid halide. The membrane dried in an oven with the web reaching a temperature of 74° C. and residual chemicals were subsequently extracted in hot water (60° C.). The membrane was then coated on the thin film side with a 2% w/w solution of polyvinyl alcohol and on the fabric side with a 5% w/w solution of sodium citrate, and dried to dryness.

Components of the aqueous phase included: a polyamine, m-phenylenediamine (MPD: DuPont, Wilmington, Del.): a drying agent, triethylamine camphorsulfonic acid (TEACSA; Sunland Chemical and Research, Los Angeles, Calif.); a boron rejection-enhancing additive, PHMB (20 wt % aqueous solution; Arch Chemicals, Norwalk, Conn.); and a polar solvent, water.

Components of the organic phase included: a polyfunctional acid trimesoyl chloride (TMC; Sigma Aldrich, St. Louis, Mo.); non-polar liquids that include 1,3,5-trimethylbenzene (TMB, mesitylene; Sigma Aldrich, St. Louis, Mo.)

and an isoparaffinic solvent, Isopar™ solvent (a low odor, low aromatic hydrocarbon solvent from ExxonMobile Chemical Company, Houston, Tex.).

The flux, salt rejection and boron rejection of the six TFC membranes were tested and the results are shown in Table 1, below. To test for boron rejection, a feed sample was first prepared by adding a known amount of boric acid to a known volume of water (e.g., reverse osmosis water) to make a final concentration of 5 ppm boron, followed by flatsheet bench or skid element testing. At the end of the test, the feed and permeate samples were collected directly in ICP (inductively coupled plasma) vials and the pH and temperature of the feed solution was measured. Boron rejection values were measured using a Horiba ULTIMA 2 ICP-OES (optical emission spectrometer), with the permeate samples measured directly and the feed solutions diluted by a factor of 20 with deioinzed water. Measurements were accurate within ±2%.

The flux and salt rejection were tested with a solution of NaCl (32,000 ppm) in water at 800 psi and 25° C. after 1 hour. Volume and time measurements were taken in a graduated cylinder and flux was determined using the following equation:

$$\text{Flux}(gfd) = \frac{\text{permeate(gallons)}}{\text{membrane area(ft}^2) \cdot \text{time(day)}}.$$

Salt rejection was measured from the same volume of permeate collected for flax measurements and was measured with a conductivity meter.

TABLE 1

Flux, salt rejection and boron rejection values of TFC membranes 1-6

| TFC membrane | Flux (GFD) | Salt rejection (%) | Boron rejection (%) |
|---|---|---|---|
| 1 (0 ppm PHMB) | 22.6 | 99.82 | 89.26 |
| 2 (100 ppm PHMB) | 18.7 | 99.84 | 91.21 |
| 3 (500 ppm PHMB) | 17.2 | 99.86 | 92.09 |
| 4 (1000 ppm PHMB) | 15.3 | 99.85 | 92.20 |
| 5 (2500 ppm PHMB) | 10.3 | 99.75 | 91.98 |
| 6 (5000 ppm PHMB) | 9.7 | 99.64 | 91.02 |

As Table 1 shows, the TFC membrane that did not contain any PHMB additive exhibited a boron rejection of less than 90% (89.26%) while the membranes prepared using PHMB as an additive displayed boron rejection values over 90%. The membranes prepared with PHMB also maintained high salt rejection and exhibited only a slight decrease in flux, particularly for those membranes containing 1000 ppm PHMB or less, as compared to the membrane not containing any PHMB.

2. Preparation and Testing of Thin Film Composite Membranes Containing a Boron Rejection-Enhancing Additive Thin film composite (TFC) membranes containing the boron rejection-enhancing additive polyhexamethylene biguanide (PHMB) were prepared by interfacial polymerization and tested and evaluated in spiral-would elements in a pilot test facility. The membranes were prepared by applying an aqueous solution containing: 4.5% w/w triethylamine camphor-sulfonic acid (TEACSA: Sunland Chemical and Research, Los Angeles, Calif.), 4.4% w/w m-phenylenediamine (MPD DuPont, Wilmington, Del.), and 0.05% w/w PHMB (20 wt % aqueous solution; Arch Chemicals, Norwalk, Conn.) to a polyester nonwoven reinforced polysulfone support. Two membranes also contained 0.1% w/w of the nonionic surfactant Brij™98. After droplets from the surface were removed, a solution containing: 4% w/w mesitylene in an isoparaffinic solvent, Isopar™ G (a low odor, low aromatic hydrocarbon solvent from ExxonMobile Chemical Company, Houston, Tex.) and 0.19% w/w trimesoyl chloride (TMC; Sigma Aldrich, St. Louis, Mo.) was applied. The membranes were then dried in an oven with the web reaching a temperature of 74° C. and residual chemicals were subsequently extracted in hot water (60° C.). The membranes were then coated on the thin film side with a 2% w/w solution of polyvinyl alcohol and on the fabric side with a 5% w/w solution of sodium citrate, and dried to dryness.

The flat sheet dry membranes were then tested with a solution of NaCl (32,000 ppm) in water at 800 psi and 25° C. for flux and TDS rejection. The results are shown in Table 2, below.

The membranes were subsequently rolled into 8 spiral wound elements having a diameter of 8" and a length of 40" containing 400 ft² of membrane. These elements were installed into a pilot test facility and used to process seawater. After about 1 week of operation, the elements were tested again for flux and total dissolve solids (IDS) rejection as well as boron rejection. The results are shown in Table 2, below Measurements marked with a * were converted from values measured in gpd using the formula:

Average flux rate(gfd)=permeate flow(gpd)/membrane area (ft²)

Boron rejection was calculated using the formula:

$rej_B = 1 - P_B/F_B$ where $P_B$ and $F_B$ are the boron content of the permeate and feed, respectively.

TABLE 2

Flux, TDS rejection and boron rejection values of TFC membranes containing PHMB

| | Flat Sheet | | Element | | |
|---|---|---|---|---|---|
| | Flux (gfd) | Rejection (%) | Rejection (%) | Flux (gpd) | Flux (gfd) | Boron Rejection (%) |
| Membrane without Brij ™ 98 | 17.0 | 99.8 | 99.8 | 6700 | 16.75* | 93.2 |
| Membrane 1 with 0.1% Brij ™ 98 | 14.3 | 99.84 | 99.78 | 5400 | 13.5* | 93.4 |
| Membrane 2 with 0.1% Brij ™ 98 | 18.3 | 99.85 | 99.78 | 5500 | 13.75* | 92.7 |

As shown in Table 2, all membranes and elements displayed high salt rejection initially and after 1 week of testing and had boron rejection values significantly higher than the 90% threshold (93.2%, 93.4%, and 92.7%). Flux values measured after testing the elements for 1 week were slightly lower than the initial flat sheet values, with a slightly higher flux observed for the membranefelement that did not contain any of the surfactant Brij™ 98.

3. Comparison of a Thin Film Composite Membrane Incorporating a Boron Rejection-Enhancing Component in the Membrane with a Membrane Post-Treated with the Component Two thin film composite membranes were prepared by interfacial polymerization and the boron rejection characteristics were compared at several time points post-formation. One membrane incorporated the boron rejection-enhancing additive PHMB into the structure of the membrane and the other membrane did not contain PHMB in the structure of the membrane, but was post-treated with a solution containing PHMB after membrane formation.

The membrane containing PHMB as an additive was prepared by applying an aqueous solution containing: 4.5% w/w triethylamine camphor-sulfonic acid (TEACSA; Sunland Chemical and Research, Los Angeles, Calif.), 4% w/w m-phenylenediamine (MPD; DuPont, Wilmington, Del.), 0.1% w/w of the nonionic surfactant Brij™ 98, and 0.05% w/w PHMB (20 wt % aqueous solution; Arch Chemicals, Norwalk, Conn.) to a polyester nonwoven reinforced polysulfone support. After droplets from the surface were removed, a solution containing: 4% w/w mesitylene in an isoparaffinic solvent, Isopar™ G (a low odor, low aromatic hydrocarbon solvent from ExxonMobile Chemical Company, Houston, Tex.) and 0.19% w/w trimesoyl chloride (TMC; Sigma Aldrich, St. Louis, Mo.) was applied. The membrane was then dried in an oven with the web reaching a temperature of 74° C. and residual chemicals were subsequently extracted in hot water (60° C.). The membrane was then coated on the thin film side with a 2% w/w solution of polyvinyl alcohol and on the fabric side with a 5% w/w solution of sodium citrate, and dried to dryness. The membrane was subsequently rolled into 8 spiral wound elements having a diameter of 8" and a length of 40" containing 400 ft² of membrane. The element was further treated with water at 100 psi for one hour.

The membrane post-treated with an aqueous PHMB solution was prepared by applying an aqueous solution containing: 4.5% w/w TEACSA (Sunland Chemical and Research, Los Angeles, Calif.), 4% w/w MPD (DuPont, Wilmington, Del.), and 0.1% w/w of the nonionic surfactant Brij™ 98 to a polyester nonwoven reinforced polysulfone support. After droplets from the surface were removed, a solution containing: 4% w/w mesitylene in an isoparaffinic solvent, Isopar™ G (a low odor, low aromatic hydrocarbon solvent from ExxonMobile Chemical Company, Houston, Tex.) and 0.19% w/w TMC (Sigma Aldrich, St, Louis, Mo.) was applied. The membrane was then dried in an oven with the web reaching a temperature of 74° C. and residual chemicals were subsequently extracted in hot water (60° C.). The membrane was then coated on the thin film side with a 2% w/w solution of polyvinyl alcohol and on the fabric side with a 5% w/w solution of sodium citrate, and dried to dryness. The membrane was subsequently rolled into 8 spiral wound elements having a diameter of 8" and a length of 40" containing 400 ft² of membrane. The element was further treated with an aqueous solution containing 50 ppm PHMB at 100 psi for one hour.

Both elements were tested using a skid system with an aqueous solution having 32,000 ppm NaCl and 5 ppm boron at 800 psi. Measurements were taken at various time points to determine boron rejection. The boron rejection values of the elements were calculated using the following equation:

$$\text{Boron rejection} = 1 - P_B/F_B$$

where $P_B$ and $F_B$ are the boron content of the permeate and feed, respectively. Table 3, below, shows the boron rejection values of the membrane that incorporates PHMB into the structure of the membrane (Membrane A) as described in the present invention and the membrane that was post-treated with PHMB (Membrane B).

TABLE 3

Boron rejection values of TFC Membranes that either incorporate PHMB in the structure or are post-treated with PHMB

| Time (hr) | Boron rejection (%) | |
|---|---|---|
| | Membrane A | Membrane B |
| 1 | 95.1 | 96.3 |
| 2 | 95.2 | 96.2 |
| 4 | 95.1 | 95.8 |
| 8 | 95.4 | 95.3 |
| 24 | 95.3 | 94.5 |
| 48 | 95.2 | 92.1 |
| 72 | 95.3 | 91.3 |
| 144 | 95.1 | 83.2 |
| 288 | 95.2 | 77.1 |
| 600 | 95.3 | 76.3 |

As shown in Table 3, the membrane post-treated with PHMB (Membrane B) initially exhibited a slightly higher boron rejection rate of 96.3%, compared with a 95.1% rejection rate for the membrane that incorporated PHMB into the structure of the membrane (Membrane A). After only two days (48 hours) of operation, the boron rejection rate of Membrane B had dropped to 92.1% (a 4.2% decrease), and after 25 days (600 hours) of operation had further dropped to 76.3%, a 20% decrease from the initial boron rejection rate. During the same time period, Membrane A, which incorporated the PHMB into the structure of the membrane, displayed boron rejection values that never dropped below the initial value of 95.1% and after 25 days (600 hours) had a slightly increased boron rejection value of 95.3%.

4. Preparation and Testing of a Thin Film Composite Membrane Containing a Boron Rejection-Enhancing Additive and a Metal Dictate Additive A thin film composite (TFC) membrane containing the boron rejection-enhancing additive polyhexamethylene biguanide (PHMB) and a metal chelate additive containing a bidentate ligand and a metal atom or metal ion in the aqueous phase was prepared by interfacial polymerization. The membrane was tested for flux salt rejection and boron rejection.

The membrane was prepared using the following general procedure. A polyester nonwoven reinforced polysulfone support was coated with an aqueous solution that contained a polyamine and PHMB and a metal chelate additive containing a bidentate ligand and a metal atom or metal ion. After droplets from the surface were removed, the support was coated with an organic solution that contained a polyfunctional acid halide. The membrane dried in an oven with the web reaching a temperature of 74° C. and residual chemicals were subsequently extracted in hot water (60° C.).

Components of the aqueous phase included: 1.5% of a polyamine, m-phenylenediamine (MPD; DuPont, Wilmington, Del.); 4.5% of a drying agent. triethylamine camphor-sulfonic acid (TEACSA; Sunland Chemical and Research, Los Angeles, Calif.); 0.1% of a boron rejection-enhancing additive, PHMB (20 wt % aqueous solution; Arch Chemicals, Norwalk, Conn.): 0.1% of the nonionic surfactant Brij™ 98; 0.023% of a metal chelate additive, $Sr(F_6acac)_2$; and a polar solvent, water.

Components of the organic phase included: 0.19% of a polyfunctional acid halide, trimesoyl chloride (TMC; Sigma Aldrich, St. Louis, Mo.); 4% 1,3,5-trimethylbenzene (TMB, mesitylene; Sigma Aldrich, St. Louis, Mo.) and the balance an isoparafinnic solvent, Isopar™ G solvent (a low odor, low aromatic hydrocarbon solvent from ExxonMobile Chemical Company, Houston, Tex.).

The flux, salt rejection and boron rejection of the TFC membrane was tested. To test for boron rejection, a feed sample was first prepared by adding a known amount of boric acid to a known volume of water (e.g., reverse osmosis water) to make a final concentration of 5 ppm boron, followed by flatsheet bench or skid element testing. At the end of the test, the feed and permeate samples were collected directly in ICP (inductively coupled plasma) vials and the pH and temperature of the feed solution was measured. Boron rejection values were measured using a Horiba ULTIMA 2 ICP-OES (optical emission spectrometer), with the permeate samples measured directly and the feed solutions diluted by a factor of 20 with deionized water. Measurements were accurate within ±2%.

The flux and salt rejection were tested with a solution of NaCl (32.000 ppm) in water at 800 psi and 25° C. after 1 hour. Volume and time measurements were taken in a graduated cylinder and flux was determined using the following equation:

$$\text{Flux}(gfd) = \frac{\text{permeate(gallons)}}{\text{membrane area}(\text{ft}^2) \cdot \text{time(day)}}.$$

Salt rejection was measured from the same volume of permeate collected for flux measurements and was measured with a conductivity meter.

The TFC membrane exhibited high flux, high salt rejection, and high boron rejection with values of 18.4 gfd, 99.91%, and 94.55%, respectively.

5. Preparation and Comparison of Thin Film Composite Membranes Containing Various Boron Rejection-Enhancing Additives A series of thin film composite (11° C.) membranes that contained various boron rejection-enhancing additives in the aqueous phase were prepared by interfacial polymerization. A control membrane not containing any boron rejection-enhancing additive was also prepared. The membranes were tested and evaluated in spiral-would elements in a pilot test facility for flux, salt rejection and boron rejection.

The membranes contained either one of the boron rejection-enhancing additives polyhexamethylene biguanide (PHMB), polyhexamethylene dicarbonate (PHMDC), or polyhexamethylene pentathiodicarbonate (PHMPTDC), or no boron rejection-enhancing additive (control). The membranes were prepared using the following general procedure. An aqueous solution containing: 4.5% w/w triethylamine camphor-sulfonic acid (TEACSA: Sunland Chemical and Research, Los. Angeles, Calif.); 4% w/w m-phenylenediamine (MPD; DuPont, Wilmington, Del.); 0.05% w/w of either polyhexamethylene biguanide (20 wt % aqueous solution; Arch Chemicals, Norwalk, Conn.), polyhexamethylene dicarbonate ($$supplier$$), or polyhexamethylene pentathiodicarbonate ($$supplier$$); and 0.1% w/w of the nonionic surfactant Brij™ 98 was applied to a polyester nonwoven reinforced polysulfone support. The control membrane did not contain any polyhexamethylene biguanide, polyhexamethylene dicarbonate, or polyhexamethylene pentathiodicarbonate, or any surfactant. After droplets from the surface were removed, a solution containing 4% w/w mesitylene in an isoparafinnic solvent, Isopar™ G (a low odor, low aromatic hydrocarbon solvent from ExxonMobile Chemical Company, Houston, Tex.) and 0.19% w/w trimesoyl chloride (TMC; Sigma Aldrich, St. Louis, Mo.) was applied to each membrane. The membranes were then dried in an oven with the web reaching a temperature of 74° C. and residual chemicals were subsequently extracted in hot water (6° C.). The membranes were then coated on the thin film side with a 2% w/w solution of polyvinyl alcohol and on the fabric side with a 5% w/w solution of sodium citrate, and dried to dryness.

The flat sheet dry membranes were then tested with a solution of NaCl (32,000 ppm) in water at 800 psi and 25° C. for flax and TDS rejection. Volume and time measurements were taken in a graduated cylinder and flux was determined using the following equation:

$$\text{Flux}(gfd) = \frac{\text{permeate(gallons)}}{\text{membrane area}(\text{ft}^2) \cdot \text{time(day)}}.$$

Salt rejection was measured from the same volume of permeate collected for flux measurements and was measured with a conductivity meter. The results are shown in Table 4, below.

The membranes were subsequently rolled into 8 spiral wound elements having a diameter of 8" and a length of 40" containing 400 ft² of membrane. These elements were installed into a pilot test facility and used to process seawater. After about 1 week of operation, the elements were tested again for flux and total dissolve solids (TDS) rejection as well as boron rejection. Boron rejection was calculated using the formula:

$$\text{rej}_B = 1 - P_B/F_B$$

where $P_B$ and $F_B$ are the boron content of the permeate and feed, respectively. The results are shown in Table 4, below. Measurements marked with a * were converted from values measured in gpd using the formula:

Average flux rate (gfd)=permeate flow (gpd)/membrane area (ft²)

TABLE 4

Flux, salt rejection and boron rejection values of TFC membranes containing various boron rejection-enhancing additives

| | Flat Sheet | | Element | | | Boron |
|---|---|---|---|---|---|---|
| | Rejection (%) | Flux (gfd) | Rejection (%) | Flux (gpd) | Flux (gfd) | Rejection (%) |
| Control | 99.72 | 18.0 | 99.68 | 5700 | 14.25* | 75.1 |
| Membrane with PHMB | 99.85 | 18.3 | 99.78 | 5500 | 13.75* | 92.7 |
| Membrane with PHMDC | 99.85 | 17.9 | 99.76 | 5500 | 13.75* | 92.4 |

TABLE 4-continued

Flux, salt rejection and boron rejection values of TFC membranes containing various boron rejection-enhancing additives

| | Flat Sheet | | Element | | | Boron |
|---|---|---|---|---|---|---|
| | Rejection (%) | Flux (gfd) | Rejection (%) | Flux (gpd) | Flux (gfd) | Rejection (%) |
| Membrane with PHMPTDC | 99.84 | 18.5 | 99.77 | 5700 | 14.25* | 92.6 |

As shown in Table 4, all membranes and elements exhibited high salt rejection and flux, though rejection values were slightly higher for the membranes prepared using one of the biguanide compounds as compared to the control membrane. All membranes prepared with one of the boron rejection-enhancing additives (i.e., polyhexamethylene biguanide, polyhexamethylene dicarbonate. Of polyhexamethylene pentathiodicarbonate) exhibited significantly higher boron rejection values as compared to the control membrane prepared in the absence of the additives and higher than the 90% threshold.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A process for preparing a thin film composite membrane, comprising:
   (a) preparing an aqueous phase comprising a polyamine and an organic phase comprising a polyfunctional acid halide, wherein the aqueous phase or organic phase or both include an additive comprising:
   a boron rejection-enhancing additive having the formula:

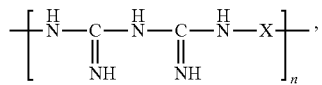

wherein:
   the formula represents a recurring polymer unit;
   n is a number between 1 and 60; and
   X is an alkyl chain having between 1 and 30 carbons; and
   (b) applying the aqueous phase to a surface of a porous support membrane to form a coated support membrane; and
   (c) applying the organic phase to the coated support membrane and interfacially polymerizing the polyamine and the polyfunctional acid halide to form a discrimination layer of a thin film composite membrane comprising the porous support membrane and the discrimination layer, the thin film composite membrane having a boron rejection that is greater than the boron rejection of a thin film composite membrane prepared in the absence of the boron rejection-enhancing additive.

2. The process of claim 1, wherein X is —$(CH_2)_6$—.

3. The process of claim 1, wherein the concentration of boron rejection-enhancing additive in the aqueous phase or organic phase is from about 0.01% to 5% based on the weight of the aqueous phase or organic phase.

4. The process of claim 1, wherein the aqueous phase or organic phase or both further include a metal chelate additive containing a bidentate ligand and a metal atom or metal ion.

5. The process of claim 4, wherein the bidentate ligand is selected from among:

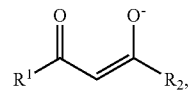
Formula V

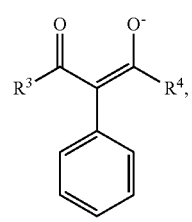
Formula VI

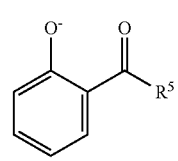
Formula VII

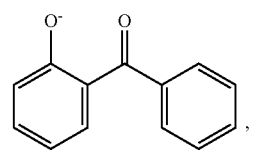
Formula VIII

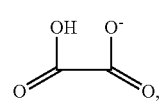
Formula IX

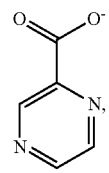
Formula X

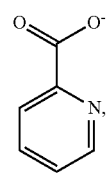
Formula XI wherein each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered aromatic ring, a 6-membered aromatic ring, an aromatic bicyclic ring, system containing two fused 6-membered rings, and an aromatic bicyclic ring system containing a 5-membered ring fused to a 6-membered aromatic ring.

6. The process of claim 4, wherein the bidentate ligand is an acetylacetonate (acac) or fluorinated acetylacetonate.

7. The process of claim 4, wherein the metal chelate additive containing a bidentate ligand and a metal atom or metal ion is selected from among Al(acac)$_3$, Al(F$_6$acac)$_3$, Ba(acac)$_2$, Ba(F$_6$acac)$_2$, Be(acac)$_2$, Be(F$_6$acac)$_2$, Ca(acac)$_2$, Ca(F$_6$acac)$_2$, Cd(acac)$_2$, Cd(F$_6$acac)$_2$, Ce(acac)$_3$, Ce(F$_6$acac)$_3$, Cr(acac)$_3$, Co(acac)$_2$, Cu(acac)$_2$, Cu(F$_6$acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F$_6$acac)$_2$, Mn(acac)$_2$, Mn(acac)$_3$, MoO(acac)$_2$, MoO(F$_6$acac)$_2$, Na(acac), Nd(acac)$_3$, Nd(F$_6$acac)$_3$, Ni(acac)$_2$, Ni(F$_6$acac)$_2$, Pd(acac)$_2$, Pr(acac)$_3$, Pr(F$_6$acac)$_3$, Ru(acac)$_3$, Ru(F$_6$acac)$_3$, Sc(acac)$_2$, Sc(F$_6$acac)$_2$, Sm(acac)$_3$, Sn(acac)$_2$, Sn(acac)$_2$Cl$_2$, t-butyl-Sn(acac)$_2$, t-butyl-Sn(acac)$_2$Cl$_2$, Sn(F$_6$acac)$_2$, Sr(acac)$_2$, Sr(F$_6$acac)$_2$, Tb(acac)$_3$, V(acac)$_3$, Y(acac)$_3$, Y(F$_6$acac)$_3$, Zn(acac)$_2$, Zn(F$_6$acac)$_2$, and Zr(acac)$_4$, wherein F$_6$acac refers to 1,1,1,5,5,5-hexafluoroacetylacetonate.

8. The process of claim 4, wherein the bidentate ligand is a beta-diketonate or a fluorinated beta-diketonate.

9. The process of claim 4, wherein the amount of bidentate ligand in the metal chelate additive yields a concentration of bidentate ligand in the aqueous phase of step (a) of from about 0.001 wt % to about 1 wt %, based on the weight of the aqueous phase.

10. The process of claim 4, wherein the metal atom or metal ion is an alkaline earth metal.

11. A thin film composite membrane prepared according to the process of claim 1.

* * * * *